(12) United States Patent
Maciel et al.

(10) Patent No.: US 11,385,993 B2
(45) Date of Patent: Jul. 12, 2022

(54) DYNAMIC INTEGRATION OF COMMAND LINE UTILITIES

(71) Applicant: Red Hat, Inc., Raleigh, NC (US)

(72) Inventors: Og Benso Maciel, Chapel Hill, NC (US); Djebran Lezzoum, Odessa (UA)

(73) Assignee: Red Hat, Inc., Raleigh, NC (US)

( * ) Notice: Subject to any disclaimer, the term of this patent is extended or adjusted under 35 U.S.C. 154(b) by 130 days.

(21) Appl. No.: 16/151,984

(22) Filed: Oct. 4, 2018

(65) Prior Publication Data

US 2020/0110695 A1   Apr. 9, 2020

(51) Int. Cl.
*G06F 11/36* (2006.01)
*G06F 11/30* (2006.01)

(52) U.S. Cl.
CPC ........ *G06F 11/3688* (2013.01); *G06F 11/302* (2013.01); *G06F 11/3684* (2013.01)

(58) Field of Classification Search
CPC ............ G06F 11/3688; G06F 11/3664; G06F 11/3684; G06F 11/3672; G06F 11/3692; G06F 11/3668; G06F 11/263; G06F 11/2294
See application file for complete search history.

(56) References Cited

U.S. PATENT DOCUMENTS

| | | | | |
|---|---|---|---|---|
| 9,047,414 B1* | 6/2015 | Matyjek | ............ | G06F 11/3692 |
| 9,880,924 B2* | 1/2018 | Peck | ..................... | G06F 11/368 |
| 9,916,233 B1* | 3/2018 | Qureshi | ............... | G06F 9/45533 |
| 2014/0310690 A1* | 10/2014 | Yang | ................... | G06F 11/3684 717/124 |
| 2017/0103015 A1* | 4/2017 | Bosschaert | ......... | G06F 11/3688 |
| 2018/0137032 A1* | 5/2018 | Tannous | .................... | G06F 8/71 |
| 2019/0278696 A1* | 9/2019 | Bromann | ................ | H04L 43/04 |
| 2019/0354465 A1* | 11/2019 | Tickoo | ................ | G06F 11/3684 |

OTHER PUBLICATIONS

Lutsky, "documentation parser to extract software test conditions", 1992, 30th Annual Meeting of the Association for Computational Linguistics, pp. 294-296 (Year: 1992).*
Pytest and tox—tox 3.2.2. dev6 documentation; https://tox.readthedocs.io/en/latest/example/pytest.html#basic-example; retrieved Aug. 29, 2018; pp. 1-4.

(Continued)

*Primary Examiner* — Bryce P Bonzo
*Assistant Examiner* — Michael Xu
(74) *Attorney, Agent, or Firm* — K&L Gates LLP

(57) ABSTRACT

Dynamic integration of command line utilities is disclosed. For example, a host has a processor and a memory, where the memory stores a first program with a command line interface (CLI). A program testing module executes on the processor to discover a plurality of commands accepted by the CLI, where a command of the plurality of commands additionally accepts a subcommand and an argument. A first input data type associated with the first command is determined. A first test case is generated that invokes the first command with first test data of the first input data type. A second input data type that is incompatible with the command is determined based on the first input data type. A second test case that invokes the command with second test data of the second input data type is generated and both test cases are executed.

18 Claims, 11 Drawing Sheets

(56) References Cited

OTHER PUBLICATIONS 26.3 unittest—Unit testing framework; https://docs.python.org/3.4/; library/unittest.html; 2018; retrieved Aug. 29, 2018; pp. 1-45.
Building Simple Command Line Interfaces in Python by Randall Degges, https://stormpath.com/blog/category/python; Nov. 2, 2015; retrieved Aug. 29, 2018; pp. 1-21.

\* cited by examiner

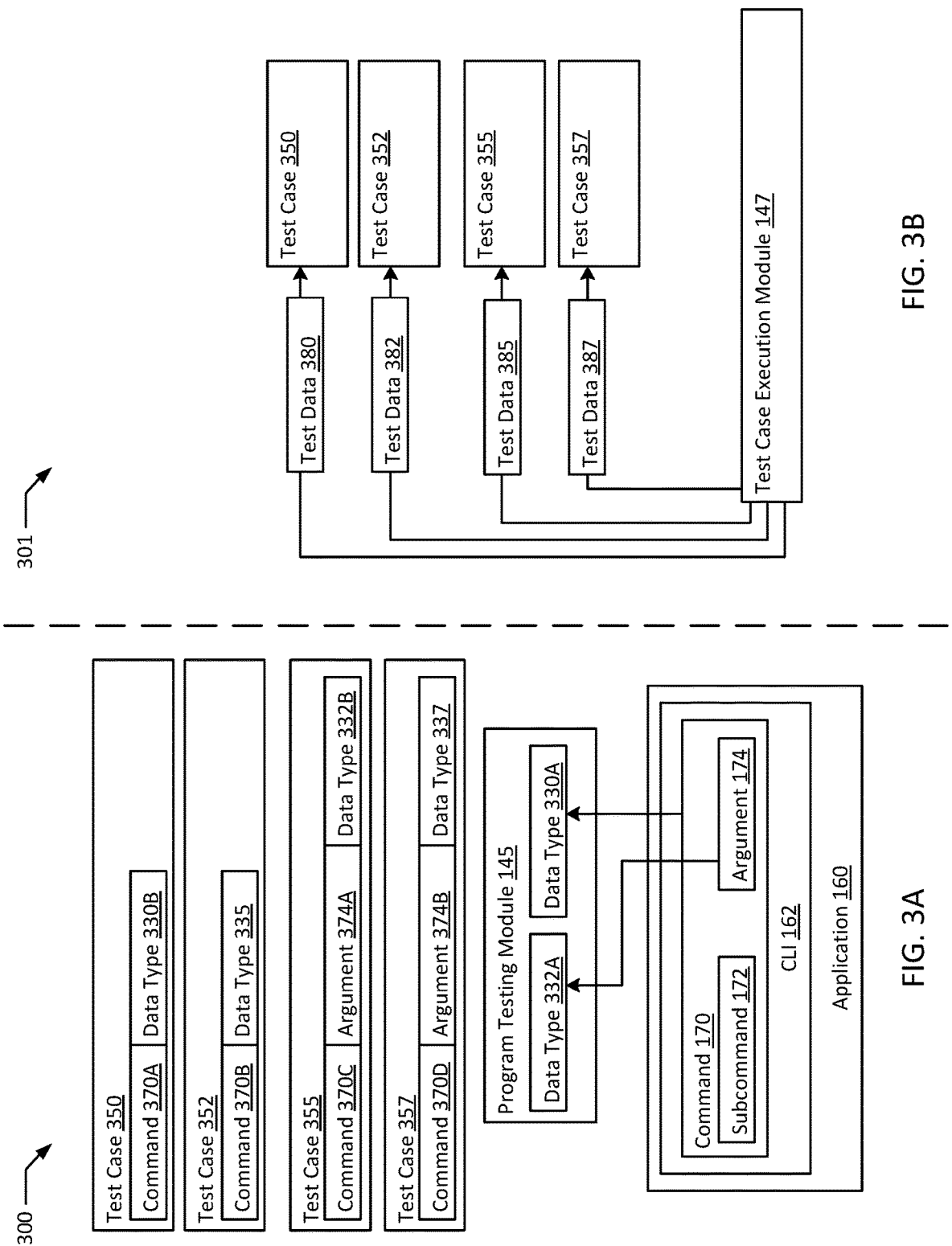

DYNAMIC INTEGRATION OF COMMAND LINE UTILITIES

BACKGROUND

The present disclosure generally relates to developing and executing computer programs in computer systems. For rapid development and deployment of software, developers may often seek to integrate existing code modules into new software programs. In addition, for scalability and efficiency reasons, many computer systems employ virtualized guests such as virtual machines and containers to execute computing tasks performed by the computing systems, such as for hosting application programs. Typically, guests such as containers and virtual machines may be launched to provide extra compute capacity of a type that the guest is designed to provide, while isolating compute resources used by different users and tenants away from those of other users. Employing guests enables rapid scaling of applications to the volume of traffic requesting the services provided by those applications. In addition, guests typically allow for increased deployment flexibility since guests may typically be deployed in a variety of hardware environments. Multiple guests may also be clustered together to perform more complex functions than the respective guests are capable of performing individually.

SUMMARY

The present disclosure provides a new and innovative system, methods and apparatus for dynamic integration of command line utilities. In an example, a host has a processor and a memory, where the memory stores a first program with a command line interface (CLI). A program testing module executes on the processor to discover a plurality of commands accepted by the CLI, where a command of the plurality of commands additionally accepts a subcommand and an argument. A first input data type associated with the first command is determined. A first test case is generated that invokes the first command with first test data of the first input data type. A second input data type that is incompatible with the command is determined based on the first input data type. A second test case that invokes the command with second test data of the second input data type is generated and both test cases are executed.

Additional features and advantages of the disclosed method and apparatus are described in, and will be apparent from, the following Detailed Description and the Figures.

BRIEF DESCRIPTION OF THE FIGURES

FIGS. 3A-B are block diagrams of a program testing module dynamically generating test cases and test data, and a test case execution module executing the generated test cases with the test data for a command line utility according to an example of the present disclosure.

DETAILED DESCRIPTION OF EXAMPLE EMBODIMENTS

Figure 1:
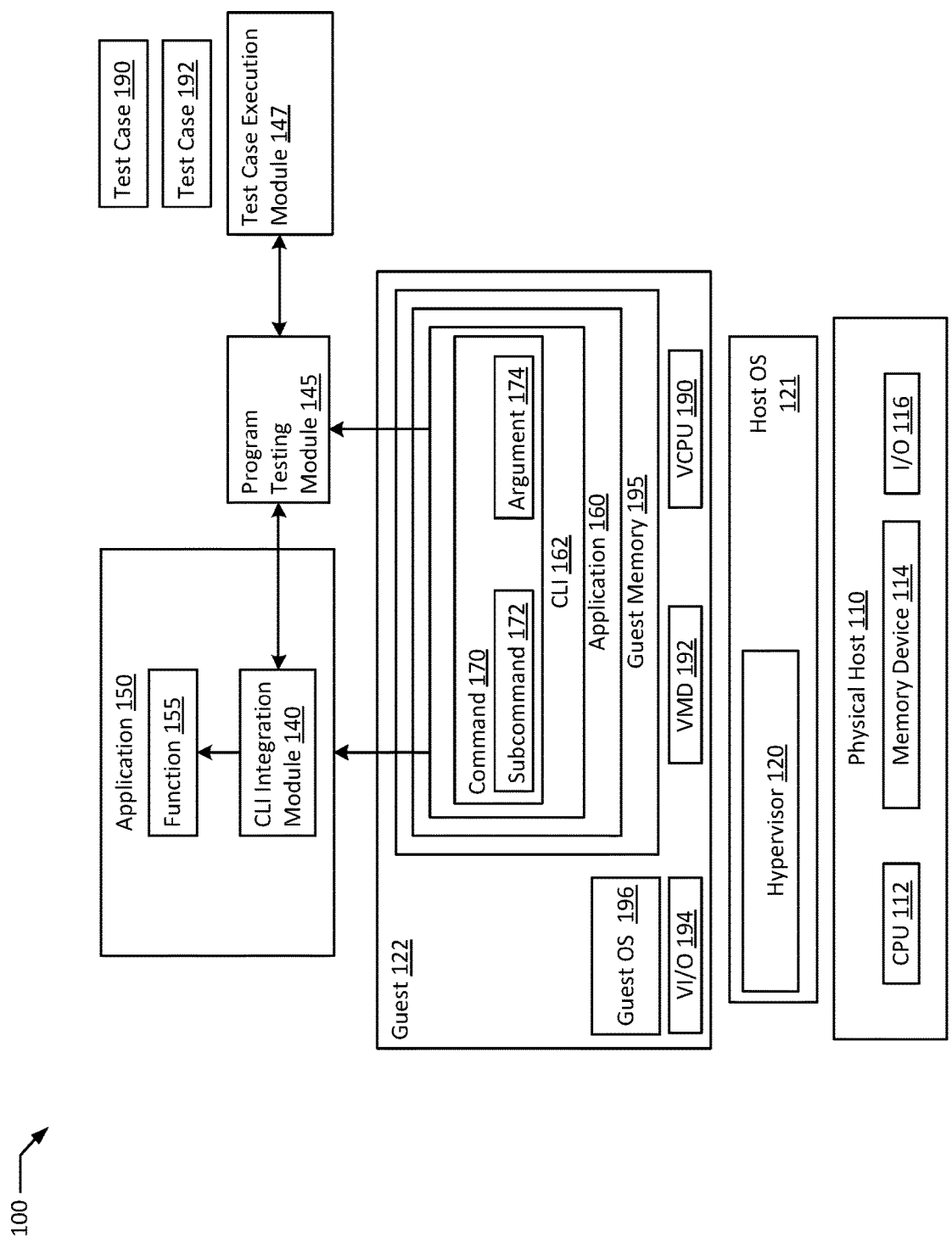
FIG. 1 is a block diagram of a system employing dynamic integration of command line utilities according to an example of the present disclosure.

In many computer systems, physical hardware may host guests such as virtual machines and/or containers. In an example, a virtual machine ("VM") may be a robust simulation of an actual physical computer system utilizing a hypervisor to allocate physical resources to the virtual machine. In sharing physical computing resources, guests and/or a hypervisor controlling them, may also have access to shared components of the underlying host, for example, I/O devices (e.g., network interface cards ("NICs"), storage controllers, USB controllers, PS2 interfaces, etc.). However, such access is typically restricted through a virtualization manager such as a hypervisor to ensure that virtual environments remain segregated and to prevent unauthorized access to other virtual environments on the same host, or to the host itself. In some examples, a container based virtualization system, for example, one managed by a container manager such as Red Hat® OpenShift® executing a containerization runtime environment such as Docker® may be implemented. Typically, a container will be hosted on a physical host or virtual machine that already has an operating system executing, and the container may be hosted on the operating system of the physical host or VM without executing an independent operating system of its own. Containers may be advantageous by being typically faster to deploy than virtual machines with independent operating systems and by typically incurring less computing overhead to execute than full virtual machines.

Software applications developed in a variety of programming languages are executed on physical hosts or virtual hosts (e.g., VMs and containers). Instead of redeveloping functionality of existing software programs, programmers typically seek to integrate new programs with these existing programs to utilize the features of the existing programs. However, to integrate program functionality, elevated access to the source program may be required, for example, access to the source program's source code. In addition, integrating a source program into a new program may often require in depth knowledge of the functionality of the source program. New integrations may typically require iterative, systematic quality assurance testing to ensure that they function as expected. This testing may typically need to be repeated when a source program is updated to validate that the features of the source program relied upon by a developer's new program have not been modified in any way that results in an incompatibility with any existing integrations. These extra tasks tend to present hurdles that drain away from the efficiencies gained from integrating an existing program rather than redeveloping required functionality.

Many programs are constructed with a command line interface (CLI) through which a user may interact with the computer program by issuing commands in the form of successive lines of text. Typically, since CLIs take text based input, a source program with a CLI may be interacted with by another program via its CLI by having the new program output a string of text that is accepted by the source program's CLI as an execution command. As such, a CLI may present an interface through which a source program may be invoked programmatically by another program. However, interfacing with a source program's CLI tends to be a tedious process that involves a programmer writing code to interact with an operating system on which the program executes, request the operating system to execute a command of the source program, capture the expected and error outputs of the source program to the operating system, and report these outputs back to the program invoking the source program. Typically, a programmer may construct a string from a set of constant values (e.g., the names of commands, subcommands, and arguments for the commands or subcommands of the source program), and a set of variable values (e.g., the data inputs that the source program's command is expected to execute with). This string may then be sent to the operating system to be executed as an operating system command, which then triggers the source program. If the source program is updated changing its CLI commands in some way, downstream programs that integrate with the source program's CLI may well need source code updates to conform the programs to the updated CLI of the source program. In addition, it may be challenging to debug a downstream program with such an integration since it may be unclear whether a failure is due to the integration code or the source program itself. Where a source program is an emerging product being aggressively developed, supporting a downstream application reliant on such a source program becomes a very inefficient task typically requiring many different programming utilities and in many circumstances, user input in order to discover and then correct malfunctions introduced by changes to source program dependencies. In addition, many relatively minor malfunctions may not be detected until a user attempts to use a relatively rarely used feature. For example, a change in a source program as minor as changing the order of inputs into a given command of the source program without requiring any new additional inputs would typically require a code change to downstream applications in order to maintain compatibility. Typically, a debugger is required to identify these new incompatibilities, but debuggers are rarely run without an error occurring, so repairing integrations tends to be a retroactive rather than proactive task.

The present disclosure simplifies integrating functionality from source programs with command line interfaces by dynamically discovering and updating valid commands and invocation syntax of source programs including the arguments and types of input accepted by the source programs' CLIs. In many examples, a CLI integration module as described in the present disclosure may perform command, subcommand, argument, and input type discovery without elevated operating system access and without access to the source program's source code. In a typical example, as long as the CLI integration module has rights to execute the source program via the source program's CLI, the CLI integration module has sufficient rights to dynamically discover the source program's current set of accepted commands including various permutations of commands as modified by subcommands and/or command arguments. This allows for programs that dynamically update with a source program's changes, provided that such changes do not fundamentally change the inputs of a given command. For example, a syntactical change that changes the order of command elements in the source program (e.g., from COMMAND [INPUT] [ARGUMENTS] to COMMAND [ARGUMENTS] [INPUT]) may be automatically adjusted for when the CLI integration module analyzes the updated source program at runtime rather than requiring a source code update for the downstream program. By importing the up to date CLI command structure of a source program at runtime as a dynamically generated function, downstream applications may be assured that they are always executing with an up to date interface to the source program. References to deprecated commands in the source program are also quickly and easily identifiable because any such references in the downstream application would fail due to attempting to invoke a function call that does not exist resulting in an error being triggered and/or logged. In addition, the CLI integration module may flexibly adapt available input data (e.g., requiring additional inputs available to the CLI interface module) to account for changes in source program command syntax while still maintaining full compatibility with prior releases of the source program.

The command discovery functionality of the CLI integration module of the present disclosure may also advantageously allow for the discovery of potential test conditions for the source program, as well as the generation and execution of automated test cases against the source program. Automated update discovery may be implemented in, for example, a test environment, and a program testing module may be configured to receive notification of updates to a source program, for example, from a host operating system. The program testing module may discover new, modified, and/or removed commands from the source program's CLI by sending a probe to the source program after such a notification, and based on the probe, the program testing module may identify new commands, subcommands, arguments, or any combination thereof for which to generate new test cases. In addition, based on the probe, the program testing module may identify input data types that may be acceptable for these new commands, and select test data of both predicted valid and predicted invalid input data types to test the new commands. A test case execution module may be configured to execute these new test cases along with re-executing previously generated test cases to provide quality assurance testing for the source program. In addition, any potential incompatibilities between the newly updated source program and any downstream applications integrated to the source program via CLI may be identified based on the source program being updated. The programmers and operators of these downstream applications need not have any access rights to modify the source program for this automated discovery and testing to occur, therefore preventing failed executions of those downstream applications due to undiscovered, newly introduced incompatibilities. These incompatibilities are discovered automatically and without elevated rights (which may pose a security risk). Dynamic integration of command line utilities therefore advantageously provides for more resilient and reliable integration of source programs while also reducing the chances of application failures due to changes in a computing environment outside of a given user or programmer's control (e.g., third party updates to source programs).

FIG. 1 is a block diagram of a system employing dynamic integration of command line utilities according to an example of the present disclosure. The system 100 may include one or more physical host(s) 110. Physical host 110 may in turn include one or more physical processor(s) (e.g., CPU 112) communicatively coupled to memory device(s) (e.g., MD 114) and input/output device(s) (e.g., I/O 116). As used herein, physical processor or processors 112 refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory device 114 refers to volatile or non-volatile memory devices, such as RAM, ROM, EEPROM, or any other device capable of storing data. As discussed herein, I/O device(s) 116 refer to devices capable of providing an interface between one or more processor pins and an external device, the operation of which is based on the processor inputting and/or outputting binary data. For example, a network interface card may be an example of an I/O device through which physical host 110 and guests (e.g., guest 122) hosted on physical host 110 communicates with external systems over a network. CPU(s) 112 may be interconnected using a variety of techniques, ranging from a point-to-point processor interconnect, to a system area network, such as an Ethernet-based network. Local connections within physical host 110, including the connections between processor 112 and a memory device 114 and between processor 112 and I/O device 116 may be provided by one or more local buses of suitable architecture, for example, peripheral component interconnect (PCI).

In an example, physical host 110 may host one or more guests (e.g., guest 122). In an example guests may be VMs and/or containers, which may additionally host additional nested layers of guests (e.g., application 150 hosted on guest 122). For example, application 150 may be another virtual guest nested inside of a virtual machine or container guest 122. In an example, a container as referred to herein may be implemented with any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster that may be deployed together (e.g., in a Kubernetes® pod). In an example, guest 122 may execute on physical host 110 (e.g., on host OS 121 of physical host 110). In an example, guest 122 may execute on a virtual host (e.g., a VM) executing on physical host 110. In addition, containers and/or VMs may further host other guests necessary to execute their configured roles (e.g., a nested hypervisor or nested containers). In an example, a guest (e.g., guest 122) further host additional guests such as a Java® Virtual Machine ("JVM"), for example, if execution of Java® code is necessary.

System 100 may run a software layer (e.g., hypervisor 120) above the hardware and below the guests (e.g., guest 122), as schematically shown in FIG. 1. In an example, the hypervisor 120 may be a component of host operating system 121, which executes on physical host 110. In another example, the hypervisor 120 may be provided by an application running on host operating system 121. In an example, hypervisor 120 may run directly on physical host 110 without an operating system beneath hypervisor 120. Hypervisor 120 may virtualize the physical layer, including processors, memory, and I/O devices, and present this virtualization to guests (e.g., guest 122) as devices, including virtual central processing unit ("VCPU") 190, virtual memory devices ("VIVID") 192, virtual input/output ("VI/O") device 194, and/or guest memory 195. Processor virtualization may be implemented by the hypervisor 120 scheduling time slots on physical processors 112 such that from the guest operating system's perspective those time slots are scheduled on a virtual processor 190.

Guest 122 may run on any type of dependent, independent, compatible, and/or incompatible applications on the underlying hardware and host operating system 121. In an example, application 150 running on guest 122 may be dependent on the underlying hardware and/or host operating system 121. In another example, application 150 running on guest 122 may be independent of the underlying hardware and/or host operating system 121. In an example, application 150 running on guest 122 may be compatible with the underlying hardware and/or host operating system 121. Additionally, application 150 running on guest 122 may be incompatible with the underlying hardware and/or OS. The hypervisor 120 may manage memory for the host operating system 121 as well as memory allocated to guest 122 and guest operating system 196 such as guest memory 195 provided to guest OS 196. In an example, guest 122 may execute on host OS 121, and may be dependent on host OS 121 for memory and/or processor management. In an example, code executing on guest 122 may be required to be compatible with guest OS 196 but not with host OS 121. In an example, any form of suitable network for enabling communications between computing devices, for example, a public network (e.g., the Internet), a private network (e.g., a local area network (LAN) or wide area network (WAN)), or a combination thereof may be employed to connect physical host 110 and/or guest 122 to other computer systems.

In an example, application 150 may execute on guest 122, where application 150 is dependent on some of the features of application 160, which is a different application stored in guest memory 195 that has a CLI 162 accessible to application 150 (e.g., via CLI integration module 140). In an example, CLI 162 may expose a command 170 of application 160, and command 170 may be modified with subcommand 172 and/or argument 174 to modify the inputs processed by command 170 and/or the outputs generated by command 170. In an illustrative example, application 160 may be a utility that is native to guest OS 196, for example, the grep command is typically available on Linux® systems (e.g., Red Hat Enterprise Linux®) as a utility for selecting text strings from files. In the example, application 160 may be grep, which may typically be implemented with certain subcommands (e.g., subcommand 172), for example, the "-E" subcommand may typically cause egrep, or a version of grep supporting regular expression matches to be invoked, while the "-F" subcommand may typically cause fgrep, or a version of grep requiring literal matches to be invoked. These behave very differently in that egrep processes regular expression type pattern and wild card matching, while fgrep requires literal matching. Both egrep and fgrep additionally support various other arguments (e.g., argument 174) impacting how they behave on a given input file. For example, the -i option causes matching to ignore case (e.g., capitalization), while the -v option causes non-matching lines to be selected instead of matching lines. The subcommands and/or arguments associated with a given command may therefore dramatically change the behavior of the command. In an example, rather than implementing a bespoke text matching function, application 150 integrates guest OS 196's installed version of grep (e.g., application 160) to perform text matching functionality via CLI integration module 140 generating a grep function (e.g., function 155) added to application 150.

In an example, application 150 may be an automation script, for example, that identifies files which may require modification due to certain key text patterns identified in those files, and the automation script may be configured to systematically perform these searches while navigating through various directories in a file system. In an example, CLI 162 may be incapable of performing the tasks of application 150, for example, due to being unable to support recursive traversing of a file system. In an example, even for a source application 160 that has a recursive execution option via an argument, a custom script may be needed to execute the source application 160 on a high level directory such as the root directory, for example, if the default implementation would take excessively long or run out of memory to run on a larger data set. In an example, application 150 may be implemented in a different programming language from application 160, and CLI integration module 140 may generate function 155 without access to application 160's source code, provided that CLI integration module 140 has access to application 160's executable code. In an example, CLI integration module 140 may be a module in application 150 (e.g., a shared library). In another example, CLI integration module 140 may be implemented outside of application 150, for example, as a stand alone utility of guest OS 196 or as a component of a software development kit used to develop application 150. In an example, program testing module 145 may be implemented with a similar command discovery mechanism to CLI integration module 140, and instead of outputting a function (e.g., function 155) for integrating the features of CLI 162, program testing module 145 may output test cases (e.g., test cases 190 and 192) to test the commands (e.g., command 170 as modified by subcommand 172 and/or argument 174) of CLI 162. In the example, these tests (e.g., test cases 190 and 192) are executed by test case execution module 147. In an example, program testing module 145 and/or test case execution module 147 may be standalone programs or modules integrated into another program, for example, a debugger or an automated code testing utility.

As computing environments grow larger, many tasks typically require automation in order for computing tasks to be scalable. For example, operating system updates, including security updates need to be systematically and regularly installed to each host in an environment to protect against unauthorized intrusions and erroneous code execution. These updates are typically provided by operating system vendors (e.g., vendors of guest OS 196 and/or host OS 121), for example, Red Hat® for Red Hat Enterprise Linux® ("RHEL") In the case of Red Hat®, customers may set up a Red Hat Satellite® installation on a local server to serve these operating system updates to other hosts connected to the Red Hat Satellite® via intranet rather than having each host connect over the internet to Red Hat® servers for their updates. The Red Hat Satellite® server keeps an up to date copy of updates from Red Hat® for RHEL, and provides these to its connected hosts, both virtual and physical. This allows hosts segregated from the internet (e.g., by firewall) to still receive updates, and reduces network bandwidth requirements for delivering updates by relegating most traffic to the intranet level. Red Hat Satellite® has a CLI known as Hammer. Hammer provides an interface through which an administrator may perform tasks such as updating the operating system of a given host. Administrators will often script Hammer commands together to allow them to be run on groups of hosts or even an entire environment to keep their environment up to date. However, since Red Hat Satellite® is continuously being developed and updates are rolled out continuously, Hammer is also often updated. These updates may make slight changes to Hammer usage syntax, and/or add or remove commands and features from Hammer and Red Hat Satellite®. Implementation of the CLI integration module 140 in these scripts (e.g., application 150), allows for automating Red Hat Satellite® (e.g., application 160) administrative tasks through Hammer (e.g., CLI 162), while significantly reducing the chances that updates to Red Hat Satellite® will cause an automation script (e.g., application 150) to malfunction. In addition, automated testing of any new features may be implemented via command discovery and automated test case generation by program testing module 145, as well as test execution by test case execution module 147 as described herein.

Figures 2A, 2B:
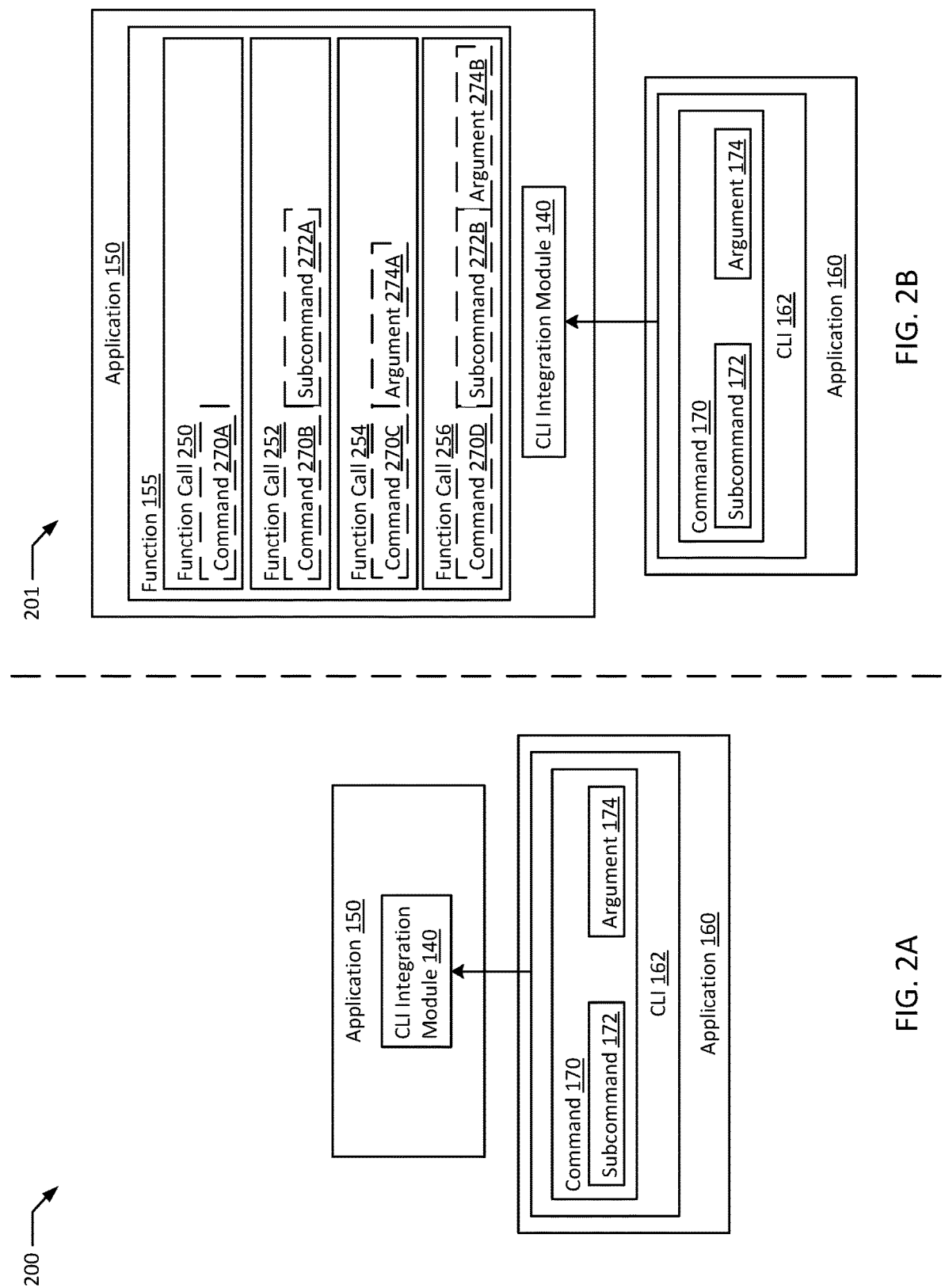
FIGS. 2A-B are block diagrams of a CLI integration module dynamically generating a function to integrate a command line utility into another program according to an example of the present disclosure.

FIGS. 2A-B are block diagrams of a CLI integration module dynamically generating a function to integrate a command line utility into another program according to an example of the present disclosure. System 200 illustrates an application 160 being integrated into application 150 by CLI integration module 140. In example system 200, commands 270A-D are references to command 270, subcommands 272A-B are references to subcommand 172, and arguments 274A-B are references to argument 174. In an example, a developer configures a CLI integration module 140 to integrate application 160's CLI 162 into application 150. In the example, CLI integration module 140 performs command discovery on CLI 162. For example, CLI integration module 140 queries application 160 for a list of commands for CLI 162 and/or example inputs for these commands. In a Linux® example, CLI 162 may be implemented with a "man page" or "-help" option which may list the accepted commands, subcommands, arguments, and/or inputs for CLI 162. In various examples, online command databases and other repositories may be queried for command discovery. For example, the source code of many programs, especially open source programs, is typically available in online repositories such as GitHub®, and CLI integration module 140 may be configured to retrieve and parse the source code of application 160 for valid commands and command syntax. In an example, application 160 may be implemented with a scripting language, and CLI integration module 140 may directly parse the files included in application 160 for valid commands.

System 200 illustrates CLI integration module 140 performing command discovery for command 170 and its associated subcommand 172 and associated argument 174 to generate a function 155 with function calls 250, 252, 254, and 256, with function 155 being incorporated into application 150 to allow application 150 to execute with the functionality of application 160. For example, CLI integration module 140 generates various permutations of valid commands, subcommands, and arguments to produce valid function calls 250, 252, 254, and 256 which may be invoked in the source code of application 150. Taking the earlier grep example with grep as command 170, in guest OS 196, grep may default to an egrep mode supporting regular expressions, and so function call 250 may be generated with the command grep (e.g., command 270A). Function call 252 may represent grep (command 270B) as modified by a -F option which triggers the fgrep subcommand (e.g., subcommand 272A) requiring literal matching. Function calls 254 and 256 may be further modified versions of function calls 250 and 252, where argument 274A is added (e.g., adding a -v option to return non-matching rather than matching results). In the example, function call 254 is a function call corresponding to invoking grep -v (e.g., command 270D modified by argument 274A), while function call 256 is a function call corresponding to invoking fgrep -v or grep -Fv (e.g., command 270D modified by subcommand 272B and argument 274B). Therefore in the illustrated example system 201, four combinations of behaviors for one command 170 may be exposed to application 150 from the various permutations of one command 170 with one subcommand 172 and one argument 174. With more complex CLIs, there may be many more permutations of commands, subcommands, arguments and inputs for CLI integration module 140 to integrated. For example, Hammer for Red Hat Satellite® has dozens of primary subcommands, which in turn have secondary subcommands and/or accepted arguments for tasks such as authenticating with Red Hat® servers, updating local Red Hat Satellite® files from, authorizing local hosts to connect to the Red Hat Satellite® instance for updates, etc. In an example, CLI integration module 140 requires only a location where application 160 is stored or an identifier for application 150 recognized by guest OS 196 in order to be configured to discover commands to add to function 155. In the example, a command to CLI integration module 140 may be issued to update function 155 with the current commands of CLI 162, and this update command may be executed automatically based on certain triggers, for example, whenever application 150 begins execution and/or periodically based on a time interval.

FIGS. 3A-B are block diagrams of a program testing module dynamically generating test cases and test data, and a test case execution module executing the generated test cases with the test data for a command line utility according to an example of the present disclosure. Example system 300 depicts a program testing module 145 configured to generate test cases to be executed for CLI 162 of application 160. In an example, program testing module 145 may be associated with CLI integration module 140. In an example, program testing module 145 may be configured to execute when installed in test servers where new code is tested. For example, program testing module may be configured to be triggered to execute whenever guest OS 196 detects an update to files associated with certain applications with CLIs (e.g., application 160 with CLI 162). In an example program testing module 145 may be implemented with a similar command discovery application parsing and querying module to CLI integration module 140. In other examples, program testing module 145 may rely on CLI integration module 140 to discover command 170, subcommand 172, and argument 174 of CLI 162. In either example, program testing module 145 may further analyze CLI 162 (e.g., sample invocation syntax in a help file associated with CLI 162) for valid data types (e.g., data types 330A, 332A) associated with given command, subcommand, and/or argument combinations.

Taking the earlier example with grep as application 160, under typical circumstances there will be two inputs into grep, a string (including a regular expression) to search for, and a file (or directory) to search in. Therefore a default data type (e.g., data type 330A) for inputs into grep would include data type string. However, certain arguments may be associated with alternative data types, for example, the -m argument restricts result sets to a certain number of matches, and so invoking the grep command with the -m argument would include at least one additional input with a numerical data type (e.g., int, float, etc.). Therefore in illustrated example system 300, a first test case 350 may be a test case for invoking command 170 without any modifications, and with a data type 330B that is expected to successfully execute. For example, grep hello myfile.txt. In the example, a second test case 352 is generated with a data type 335 different from data type 330B, where data type 335 may be selected from a data type typically incompatible with data type 330B, and therefore test case 352 may be expected to generate an error. For example, grep hello NULL. In the example, feeding in a null value for the file to be evaluated would trigger an error. However, in certain cases, a data type selected as a potentially incompatible input may in fact succeed to execute, albeit in an unexpected way. For example, with an expected data type 330B of string, sending in a random input of a numerical data type (e.g., int, float, etc.) may allow the source program to execute. In an example, the reverse scenario would be more likely to create an error, for example, an input expected to be numerical would likely generate an error with a text input. In an example where a test case is constructed to use a numerical value as a matching value for the grep command, the command would likely execute properly by interpreting the number as a string. In such test cases, the unexpectedly successful execution may be flagged for review. For example, a test log may be generated where failures of test cases expected to execute and unexpected successful executions of test cases expected to fail are recorded. In an example, these highlighted test cases may be formatted for ease of identification (e.g., bolded, italicized, etc.). In an example, these highlighted test cases may be sent to an administrator (e.g., via email, dashboard, etc.) or to an automated remediation service.

In an example, a second set of test cases (e.g., test cases 355 and 357) is constructed where the base command 170 (e.g., represented by argument 374A-B in test cases 355 and 357) is modified by an argument 174 (e.g., represented by command 370C-D in test cases 355 and 357). For example, this combination could be grep -m. In the example, an input of data type 332A-B (e.g., int, float) would be expected for the number of resulting lines to display. Test case 355 may be configured with data of data type 332B, selecting for a maximum of 10 matches. In contrast, test case 357 may be constructed to fail, and a Boolean data type (e.g, data type 337) input is configured with test case 357. In various examples, even if automated test data selection fails to yield proper test cases, by generating automated test cases, program testing module 145 identifies elements of CLI 162 that may require testing, and allows an administrator to quickly formulate a valid test case by supplying proper test data. In such examples, program testing module 145 may be configured to identify new and/or modified commands, subcommands, and/or arguments in CLI 162 after an update in order to generate new test cases and to highlight these changes to operators of guest 122.

Illustrated system 301 in FIG. 3B depicts test case execution module 147 executing test cases produced by application 160. In an example, test case execution module 147 executes each of test cases 350, 352, 355, and 357 with input data (e.g., test data 380, 382, 385, and 387) selected based on the data type(s) associated with each test case (e.g., data types 330B, 332B, 335, 337). In an example, random data of the proper type (e.g., data types 330B, 332B, 335, 337) may be generated as test data 380, 382, 385, and 387. Random or pseudorandom data work as test data for applications that manipulate data, and therefore may be sufficient in certain cases for automatically generated test cases. In certain implementations, truly random data may yield meaningless test results, so test data may be selected more rigorously. For example, a preconfigured list of inputs of various different data types may be accessible to test case execution module 147, and these preconfigured inputs may be utilized instead of random data, especially for test cases expected to succeed (e.g., test cases 350 and 355). In an example, an unexpected result from a test case may result in a notification for manual intervention to ensure that an unexpected success or failure is due to application 160 and not to the selected test data (e.g., test data 380, 382, 385, and 387). For example, program testing module 145 may assign a data type of Boolean to data type 335 as an expected failure case for an input for a search string or file name. However, application 160 may treat a value of "TRUE" (e.g., test data 382) as a search string and proceed to execute, resulting in a successful execution in a test case 352 expected to fail. In some examples, program testing module 145 and test case execution module 147 may be configured to try different data types until an expected result occurs. In an example, an administrator may be alerted to supply test data 382 that is expected to fail. In an example, a successful execution of a test case expected to fail and a failed execution of a test case expected to succeed are both conditions that merit logging and/or alerting.

Figure 4:
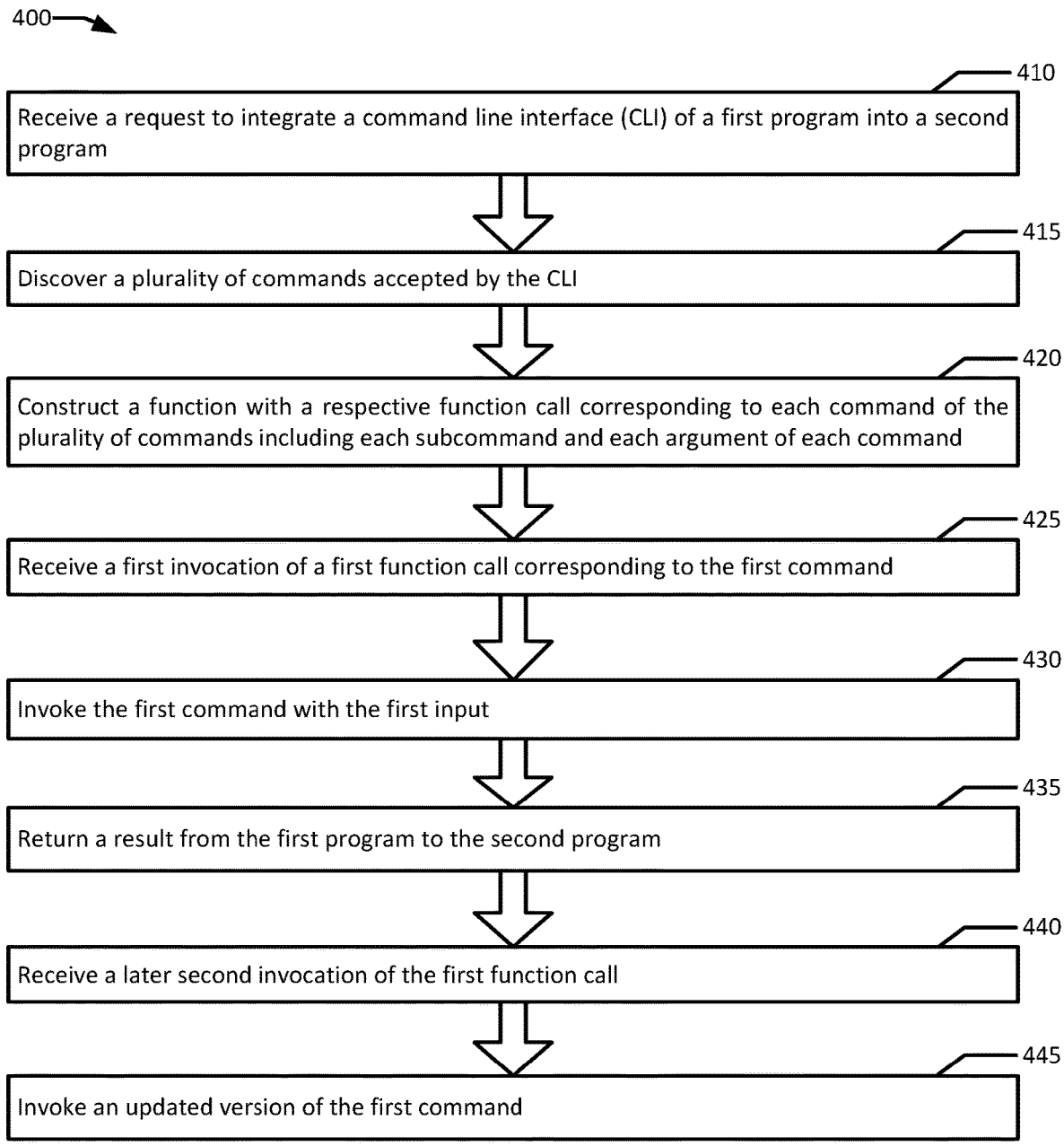
FIG. 4 is a flowchart illustrating an example of dynamic integration of command line utilities according to an example of the present disclosure.

FIG. 4 is a flowchart illustrating an example of dynamic integration of command line utilities according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method 400 is performed by a CLI integration module 140.

Example method 400 may begin with receiving a request to integrate a command line interface (CLI) of a first program into a second program (block 410). In an example, CLI integration module is implemented as a shared library incorporated into application 150 on guest 122. In the example, application 160 is a separate application stored in guest 122 that provides functionality that application 150 lacks. In these examples, application 160 may be written in a different programming language from application 150. However, application 160 has a command line interface 162 that is exposed to application 150 and CLI integration module 140 (e.g., via guest OS 196). In an example, application 150 is a virtual guest provisioning utility, for example, a container or VM orchestrator (e.g., Kubernetes®). In an example, the virtual guest provisioning utility may be connected to an operating system updating system (e.g., Red Hat Satellite®) with a CLI (e.g., Hammer). In the example, application 150 may be an automated update utility constructed to execute operating system updates (e.g., for guest OS 196) against the update system (e.g., application 160). For example, application 150 may be configured to cycle through active guests and install operating system updates from application 160 via CLI 162 for an intranet environment. In another example, application 150 may be configured to request application 150 to check for updates in order for those updates to be applied to any new guests instantiated via an orchestrator. In such an example, application 150 may be a component part of the orchestrator.

A plurality of commands accepted by the CLI are discovered (block 415). In an example, a first command (e.g., command 170) of the plurality of commands additionally accepts a first subcommand (e.g., subcommand 172) and a first argument (e.g., argument 174). Continuing the example with Red Hat Satellite® and Hammer, command 170 may be the command "hammer". In the example, hammer has many potential subcommands (e.g., subcommand 172) associated with different actions that may be performed by Red Hat Satellite® (e.g., activation-key, repository, etc.). Each subcommand may have further nested subcommands (e.g., activation-key info, activation-key subscriptions, activation-key update, repository list, repository synchronize, etc.). Each subcommand may additionally be configured to accept arguments (e.g., -organization to apply a command to a configured organization group instead of a single managed host) that alter the behavior of a command or subcommand. In the Hammer example, CLI integration module 140 may be configured to execute a hammer -help command, which may return a manual for Hammer that includes valid command, subcommand, and argument combinations as well as expected inputs for each command, subcommand, and argument. In an example, application 150 may be implemented in an object oriented programming language. In the example, this allows CLI integration module 140 to parse the manual for these inputs accepted by Hammer, and to convert these inputs into function calls that allow the various commands in Hammer to be programmed against as objects in application 150. In such an example, where the manual of a target source program (e.g., application 160) provides reliable information, parsing the manual may be an efficient way to obtain the universe of valid command, subcommand, and argument combinations accepted by the application.

In another example, CLI integration module 140 may have access to the source code of application 160, and may parse the source code for valid command, subcommand, and argument combinations. In an example, parsing source code may be supplemental to parsing manual pages. In an example, the source code of application 160 may be retrieved from across a network (e.g., from an online source code repository). Regardless of how CLI integration module 140 discovers the currently supported valid command combinations for application 160, CLI integration module 140 may further query program testing module 145 to validate the compiled list of command combinations. For example, previous testing may have indicated that a combination of arguments that appears valid based on parsing a manual may in fact include mutually exclusive arguments that cause application 160 to fail to execute. In an example, newly added commands, subcommands, or arguments may be discovered and sent to program testing module 145 to validate as valid combinations.

In an example, during command discovery, CLI integration module may additionally receive example inputs for discovered commands. For example, manual pages of command line utilities often provide command and/or syntax examples. In another example, many developers include invocation syntax in comments in their source code. In an example, based on this type of information, CLI integration module may associate the various input fields in a given command, subcommand, and/or argument invocation string with variables of certain input data types. For example, a field for a network address may be configured to accept an IP address in integer form delimited by periods. That same field may, with the addition of an argument, accept a string input that needs to be resolved by DNS to obtain an IP address. In an example, CLI integration module 140 determines that each of the inputs accepted and/or required by a given command, subcommand, and argument combination accepts inputs of one or more input data types. In an example, these input data types are selected from input data types including, but not limited to (i) characters, (ii) integers, (iii) floating-point numbers, (iv) fixed-point numbers, (v) Booleans, (vi) pointers, (vii) arrays, (viii) lists, (ix) records, (x) unions, (xi) sets, (xii) objects, (xii) strings, and (xiii) hashes. In an example, CLI integration module 140 may further send the results of command and input discovery to program testing module 145, which may be configured to generate test cases for command (e.g., command 170) and input data type (e.g., data type 330A-B, 335) combinations. In the example, both test cases with inputs that are expected to execute properly (e.g., test case 350 with input data type 330B retrieved from querying CLI 162) as well as inputs that are expected to cause errors (e.g., test case 352 with input data type 335 selected for being typically incompatible with input data type 330B). For example, if input data type 330B is an integer, then a floating point number, decimal real number, or imaginary number, or a alphabetical character may be selected as input data type 335.

A function is constructed with a respective function call corresponding to each command of the plurality of commands including each subcommand and each argument of each command (block 420). In an example, the function is added to the second program. In an example, after discovering the various commands, subcommands, arguments, and acceptable combinations thereof for application 160, CLI integration module 140 generates function 155 as a module loaded into application 150, allowing each of the combinations of commands, subcommands, and arguments to be invoked as function calls (e.g., function calls 250, 252, 254, and 256) of application 150. In an example, function 155 is regenerated each time application 150 is executed. In another example, function 155 is cached and updated between executions of application 150.

A first invocation of a first function call corresponding to the first command is received (block 425). In an example, the first function call includes a first input. In an example, when application 150 invokes function call 252 associated with command 270A (e.g., a reference to command 170) as modified by a subcommand 272A (e.g., a reference to subcommand 172). In the previously referenced Red Hat Satellite® example, command 170 may be hammer, and subcommand 272A may be a combination of subcommands (e.g., repository synchronize). In an example, an additional input is added to specify the specific repository to synchronize. In an example, CLI interface module 140 receives and interprets the function call 252 as a request to invoke application 160's CLI 162 with command 170 and subcommand 172. The first command is invoked with the first input (block 430). In an example, command 170 is invoked in response to CLI interface module 140 receiving the invocation of function call 252. In an example, CLI integration module 140 requests guest OS 196 to invoke command 170 with an input specifying the repository to synchronize. In some examples, CLI interface module 140 may launch a virtual guest (e.g., a container) in which a copy of application 160 executes, and executes application 160 in the virtual guest. A result is returned from the first program to the second program (block 435). In an example, guest operating system 196 is configured to return the results of executing command 170 back to application 150 (e.g., to CLI integration module 140). In the example where CLI integration module executes a virtual and/or emulated copy of application 160, the output of that copy of application 160 executing is captured and returned to application 150 by CLI integration module 140.

A later second invocation of the first function call is received (block 440). In an example, application 150 again invokes function call 252, for example, in a later execution of application 150. In the example, application 160 has been updated in the interim between the first and second invocations of function call 252. For example, subcommand 172 may be updated to change its invocation syntax. In the hammer example, a change may be from hammer repository synchronize <repository identifier> to hammer repository <repository identifier> synchronize. In another example, subcommand 172 may be updated to require an additional input. For example, for additional authentication, the repository synchronize subcommand may be updated to require authentication credentials (e.g., username/password, authentication token, license key, etc.).

An updated version of the first command is invoked (block 445). In an example, an updated version of command 170 is invoked in response to CLI interface module 140 receiving a new invocation of function call 252. In an example, CLI integration module 140 again invokes the updated version of command 170 with subcommand 172 based on function call 252 being invoked again. In an example, a change in syntax for subcommand 172 without changing inputs or input types is automatically accounted for by CLI integration module 140. For example, when CLI integration module 140 regenerates function call 252, the invocation name of function call 252 does not change (e.g., because the name of subcommand 172 does not change). In the example, CLI integration module 140 dynamically updates its output for guest operating system 196 to reflect the updated syntax for subcommand 172 by changing the positioning of the input (e.g., the repository identifier) in the invocation string. In an example where subcommand 172 is changed to require additional inputs, CLI integration module 140 may still dynamically update function call 252 to perform without any additional intervention. For example, application 150 may be configured with a set of stored inputs such as authentication credentials. In the example, based on authentication credentials being available in the repository of stored inputs, CLI integration module 140 adds the newly required authentication credentials to its invocation of command 170. For example, application 150 may be configured to only submit a repository identifier as an input for function call 252. However, the deficiency of function call 252's invocation to include authentication credentials may be remedied by CLI integration module 140 if those authentication credentials (e.g., username/password, authentication token, license key, etc.) are available to CLI integration module 140 through another component of application 150.

In an example, CLI integration module 140 is configured to rediscover command combinations for application 160. In an example, rediscovery may be tied to application 150 being executed. In another example, rediscovery may be based on an elapsed time. In an example, CLI integration module 140 may subscribe with guest OS 196 to be notified when dependent applications (e.g., application 160) are updated. In an example, CLI integration module 140 is notified that application 160 has been updated, and in response, CLI integration module 140 performs command rediscovery on application 160. In the example, CLI integration module 140 discovers that a second command, subcommand, argument, or combination thereof has been removed from CLI 162. In the example, CLI integration module 140 may recreate function 155 without the corresponding function calls for the removed functionality from application 160. In another example, function 155 is updated to disable those respective function calls. In an example, performing command rediscovery after an update to application 160 discovers a new command, subcommand, argument, and/or combination, and CLI integration module 140 instructs program testing module 145 to create a plurality of test cases for the new command, subcommand, argument, and/or combination.

Figure 5:
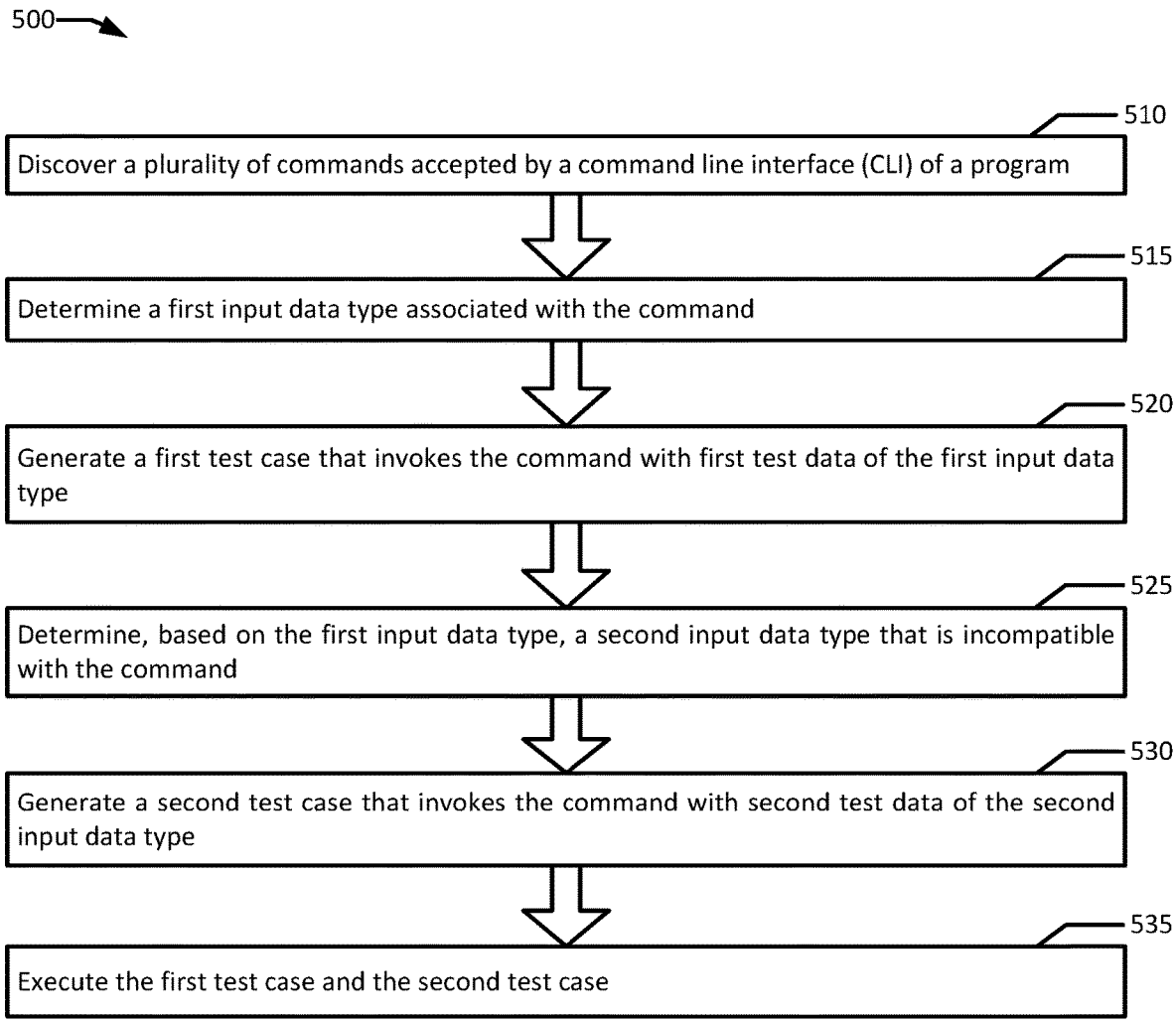
FIG. 5 is a flowchart illustrating an example of automated command line utility testing in a system employing dynamic integration of command line utilities according to an example of the present disclosure.

FIG. 5 is a flowchart illustrating an example of automated command line utility testing in a system employing dynamic integration of command line utilities according to an example of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both. In an example, the method 500 is performed by a program testing module 145 in conjunction with a test case execution module 147.

Example method 500 may begin with discovering a plurality of commands accepted by a command line interface (CLI) of a first program (block 510). In an example, a first command of the plurality of commands additionally accepts a first subcommand and a first argument. In an example system where guest 122 is deployed as a testing host, a program testing module 145 may be executed to automatically generate test cases (e.g., test case 190, 192) for new or modified functionality in certain programs configured to be monitored (e.g., application 160). In an example, guest OS 196 notifies program testing module that application 160 has been updated, for example, based on a flag to generate an alert if certain key files are modified in a directory storing application 160. In an example, program testing module 145 is notified that application 160 received an update, causing program testing module 145 to query CLI 162 to determine whether any commands (e.g., command 170), subcommands (e.g., subcommand 172), and/or arguments (e.g., argument 174) have been added or modified in application 160. For example, during a synchronization process on a test environment with Red Hat®'s servers, a Red Hat Satellite® implementation (e.g., application 160) receives an update that includes new commands for Hammer (e.g., CLI 162). In the example, the host OS for the Red Hat Satellite® instance (e.g., guest OS 196) notifies a program testing module 145 that one of the applications program testing module 145 is configured to generate test cases for has been modified. As a result, program testing module 145 queries the updated CLI 162, application 160, and/or Red Hat®'s source code repository for an updated command manifest for CLI 162 (e.g., hammer). In cases where a command, subcommand, or argument is removed, program testing module 145 may work through existing test cases to determine which test cases to disable based on the combinations of commands, subcommands, and/or arguments that were disabled in the updated application 160. In an illustrative example, a new command 170 (e.g., update_password) is introduced to hammer (e.g., CLI 162) for updating an administrator password.

A first input data type associated with the first command is determined (block 515). In an example, program testing module 145 parses a manual and/or the source code of application 160 (e.g., man page, help file, source code variable declarations, source code comments, etc.) to discover a list of commands, subcommands, arguments, and combinations thereof that are accepted by application 160. In addition, the program testing module 145 determines at least one data type that is predicted to be acceptable as an input for the various combinations of commands, subcommands, arguments and combinations accepted by CLI 162. For example, a certain input field may be labeled for a numerical input. In the example, an integer input may be determined to be the expected input type. Alternative inputs that may be tested as possibly acceptable may include floating-point numbers, fixed-point numbers, or numbers written out as strings, either in Arabic numerals or as words. In an example, a typical expected input may have an input data type of a character, an integer, a floating-point number, a fixed-point number, a Boolean, a pointer, an array, a list, a record, a union, a set, an object, a string, or a hash. In the update_password (e.g., command 170) example introduced above, two inputs may be expected, one for the current password and one for the new password. In an example, by parsing the updated manual for hammer (e.g., CLI 162), program testing module 145 discovers that both inputs are expected to be of data type string (e.g., data type 330B). In addition, program testing module 145 determines that the first input is expected to be the current password which is stored in an environment variable repository accessible to program testing module 145.

A first test case is generated that invokes the first command with first test data of the first input data type (block 520). In an example, program testing module 145 generates a first test case for a command 170 (e.g., update_password). In the example, program testing module 145 generates a first test case 350 where program testing module 145 designates that the first input into command 170 is the existing password, while the second input (e.g., the new password) will be a randomly generated string. In an alternative example, program testing module 145 designates that the second input is selected from a list of preselected test strings. In addition, based on the new input data type (e.g., data type 330A-B) being determined to be string, an alternative data type (e.g., an integer) that may be interpreted as a string may be selected to generate an alternative test case that is also expected to successfully execute. In an example, if a known input data type has similar data types (e.g., the known input is integer, then floating-point number inputs may be considered similar), test cases may be generated with the similar data types to test what inputs are actually accepted by the source program (e.g., application 160).

In an example, an input data type compatible with command 170 may be incompatible with command 170 after it has been modified by subcommand 172. For example, if a subcommand 172 of the new command 170 update_password is a subcommand max_days to specify the number of days that may elapse before a password requires updating, the expected input type may change from a string to an integer. In such an example, the update_password max_days command-subcommand combination may have additional test cases generated with different numerical data type inputs.

A second input data type that is incompatible with the first command is determined based on the first input data type (block 525). In an example, program testing module 145 may determine a data type 335 that is antithetical to data type 330A-B. For example, where data type 330B (e.g., a data type expected to be a successful input) is a string, a binary or Boolean input may be selected as an example data type (e.g., data type 335) expected to generate a failure. In an example, data type 335 may be selected by program testing module 145 based on the expected success data type (e.g., data type 330A-B). For example, for inputs that should be numerical based on the command discovery process, alphabetical character inputs may be selected to generate a failure. In other examples, the second input data type may be selected by other methods, for example, based on parsing a manual page of CLI 162 that provides examples labeled as incorrect usages. In an example, a second test case (e.g., test case 352 is generated invokes the first command (e.g., command 170) with second test data of the second input data type (e.g., data type 335) (block 530).

The first test case and the second test case are executed (block 535). In an example, test case execution module 147, which may be a component part of program testing module 145, executes test cases 350 and 352 with test data 380 (e.g., test data of data type 330B) and test data 382 (e.g., test data of data type 335). In an example, if test case 350 fails (e.g., with test data 380 that is expected to succeed) or if test case 352 succeeds (e.g., with test data 382 that is expected to fail), an error report is generated. For example, in the update_password example, a random string may fail to satisfy password complexity requirements (e.g., mixing capital and lower case characters with numbers and symbols). Alternatively, if password complexity is not based on the types of inputs but rather, for example, on the length of the new password, a long enough numerical input may be accepted as valid causing test case 352 to succeed. In either case, administrator intervention may be necessary to supply valid success and failure test data for these test cases 350 and/or 352 to be re-executed. In an example, where a numerical input is expected (e.g., update_password max_ days) but a test case fails with one type of numerical input (e.g., floating-point number) program testing module 145 may be configured to automatically retry the test with a different type of similar input (e.g., integer). In an example, program testing module 145 may be configured to redis- cover and generate new test cases (both expected success and expected failure test cases) for each new command, subcommand, and argument combination discovered in an updated source program 160.

In an example, the testing environment on which program testing module 145 executes may additionally include a CLI integration module 140. In the example, new commands, subcommands, and arguments that are discovered for testing purposes may be integrated into other programs (e.g., application 150) that depend on a source application 160. In an example, CLI integration module 140 constructs a function 155 with a respective function call (e.g., function calls 250, 252, 254, and 256) corresponding to each command of the plurality of commands including each subcommand and each argument of each command, and add function 155 to application 150. In the example, function call 250 corresponding to command 170 (e.g., via a reference to command 170 in the form of command 270A) is invoked with a first input and command 170 is executed with the input resulting in a result returned to application 150 from application 160.

Figure 6A:
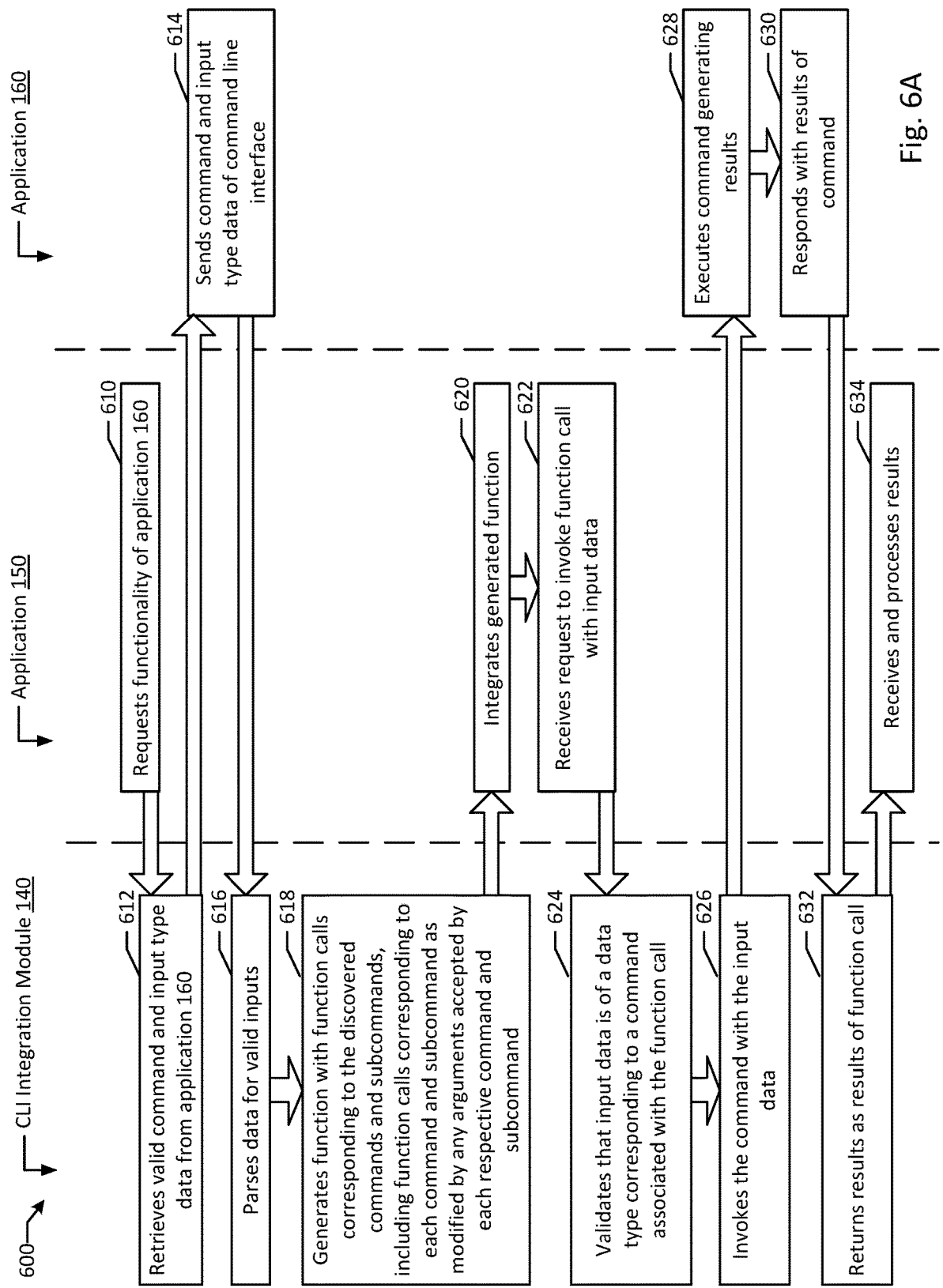
FIGS. 6A-B is flow diagram of an example of dynamic integration of command line utilities according to an example of the present disclosure.
Figure 6B:
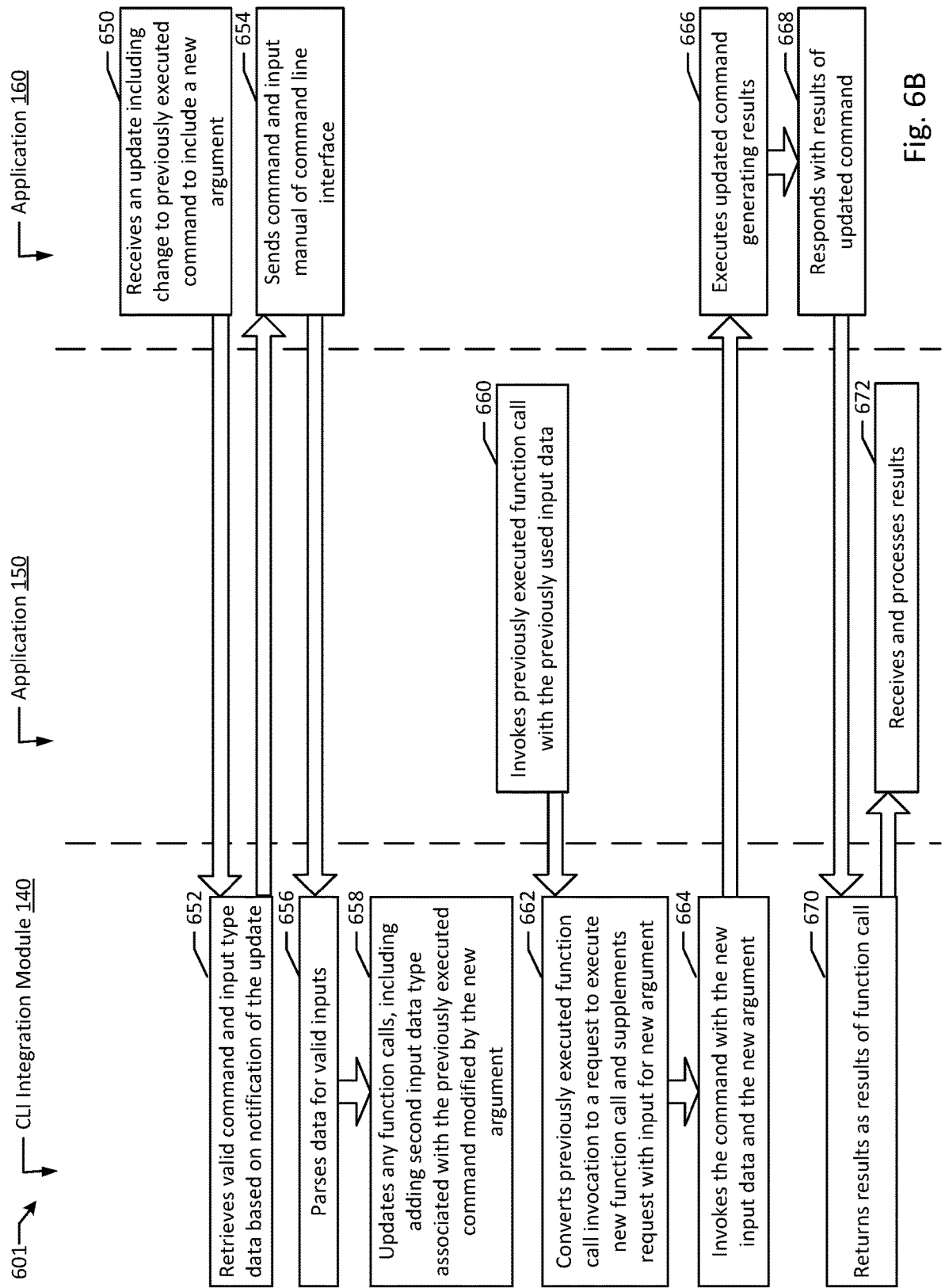

FIGS. 6A-B is flow diagram of an example of dynamic integration of command line utilities according to an example of the present disclosure. Although the examples below are described with reference to the flowchart illustrated in FIGS. 6A-B, it will be appreciated that many other methods of performing the acts associated with FIGS. 6A-B may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 600-601, CLI integration module 140 integrates application 160 into application 150 as a function, and dynamically updates the function to reflect an update to application 160.

In example system 600 depicted in FIG. 6A, application 150 requests a functionality of application 160 to be integrated (block 610). For example, application 150 is a guest instantiation orchestrator that requests updates for guest operating systems from Red Hat Satellite® (e.g., application 160) with a command line interface 162 (e.g., hammer) for the guests that application 150 manages. In the example, CLI integration module 140 retrieves valid command and input type data from application 160 (block 612). For example, CLI integration module 140 may execute command 170 of CLI 162 of application 160 with a -help option or argument to retrieve a manual of application 160. In an example application 160 sends its command and input type data for its command line interface 162 to CLI integration module 140 (block 614). In the example, CLI integration module 140 parses the received data (e.g., manual) for valid command, subcommand, argument, and input data type combinations as valid inputs to CLI 162 (block 616). In an example CLI integration module 140 may additionally retrieve the source code of application 160 for additional validation of valid inputs.

In an example, CLI integration module 140 generates a function 155 with function calls 250, 252, 254, and 256 corresponding to the discovered commands (e.g., command 170) and subcommands (e.g., subcommand 172), including function calls corresponding to each command and subcommand as modified by any arguments (e.g., argument 174) accepted by each respective command and subcommand (block 618). In an example, application 150 integrates the newly generated function 155 (block 620). For example, the newly generated function is loaded as a method or library by application 150. In an example, CLI integration module 140 is a module included in application 150, and CLI integration module 140 is configured to integrate one or more command line utilities into application 150 as dynamically generated functions. In the example, application 150 includes code that executes against these dynamically generated functions (e.g., function 155) based on a standardized integration syntax implemented by CLI integration module 140. For example, function 155 generated by CLI integration module may be configured to generate function calls in the format of command.subcommand1.subcommand2 [ARGUMENTS]; [Input 1]; [Input 2] . . . regardless of the actual syntax of the command line utility's expected invocation strings. In an example, application 150 receives a request to invoke function call 250 with specified input data (block 622). For example, prior to requesting that a new guest's OS be updated, application 150 may instruct application 160 to check for updates with a function call corresponding to the command hammer repository synchronize (e.g., command 170), with an input of an identifier (e.g., IP address) of the repository being updated. In an example, CLI integration module 140 validates that the input data (e.g., the IP address) is of a proper data type (e.g., period delimited integers)

corresponding to command 170 associated with function call 250 (block 624). In the example, CLI integration module 140 invokes command 170 with the input data, for example, by passing a string constructed to invoke command 170 to guest OS 196 (block 626). In an example, application 160 executes and generates results (e.g., update successful) (block 628). In an example, application 160 responds with the successful results of the command 170 (block 630). In an example, CLI integration module 140 returns the received results as the results of the function call 250 to application 150 (block 632). Application 150 then receives and processes the results (block 634). For example, application 150 moves on to instantiating a new guest.

In example system 601 depicted in FIG. 6B, time has elapsed since example system 600 integrated application 160 into application 150. In the example, application 160 receives an update including a change to the previously executed command 170 to include a new argument (e.g., argument 174) (block 650). In the example, CLI integration module 140 retrieves the newly updated valid command and input type data after being notified that application 160 was updated (e.g., by guest OS 196) (block 652). In an example, application 160 sends the updated command and input data type data for CLI 162 (e.g., via an updated manual) (block 654). In the example, CLI integration module 140 parses the new manual for new valid inputs for application 160 (block 656). CLI integration module 140 updates function call 250 to include the new argument 174, resulting in function call 254 that invokes command 170 with argument 174 (block 658). For example, argument 174 may be an argument specifying a license key input. In the example, application 150 invokes function call 250 that was previously successfully executed, and includes the previously validated input of an IP address corresponding to a repository to update with the invocation of function call 250 (block 660). In an example, the new argument to include a valid license key is required for executing the updated repository update command. In the example, CLI integration module 140 converts the invocation of function call 250 into an invocation of function call 254 and supplements the input of a stored license key into the request from application 150 (block 662). In an example, CLI integration module 140 invokes command 170 modified by argument 174 with the IP address input and the license key input (block 664). In an example, application 160 executes the updated command generating a successful update confirmation (block 666). In the example, application 160 responds with the successful update confirmation to CLI integration module 140 (block 670). In the example, application 150 receives and processes the confirmation moving on to a next execution step (block 672).

Figure 7A:
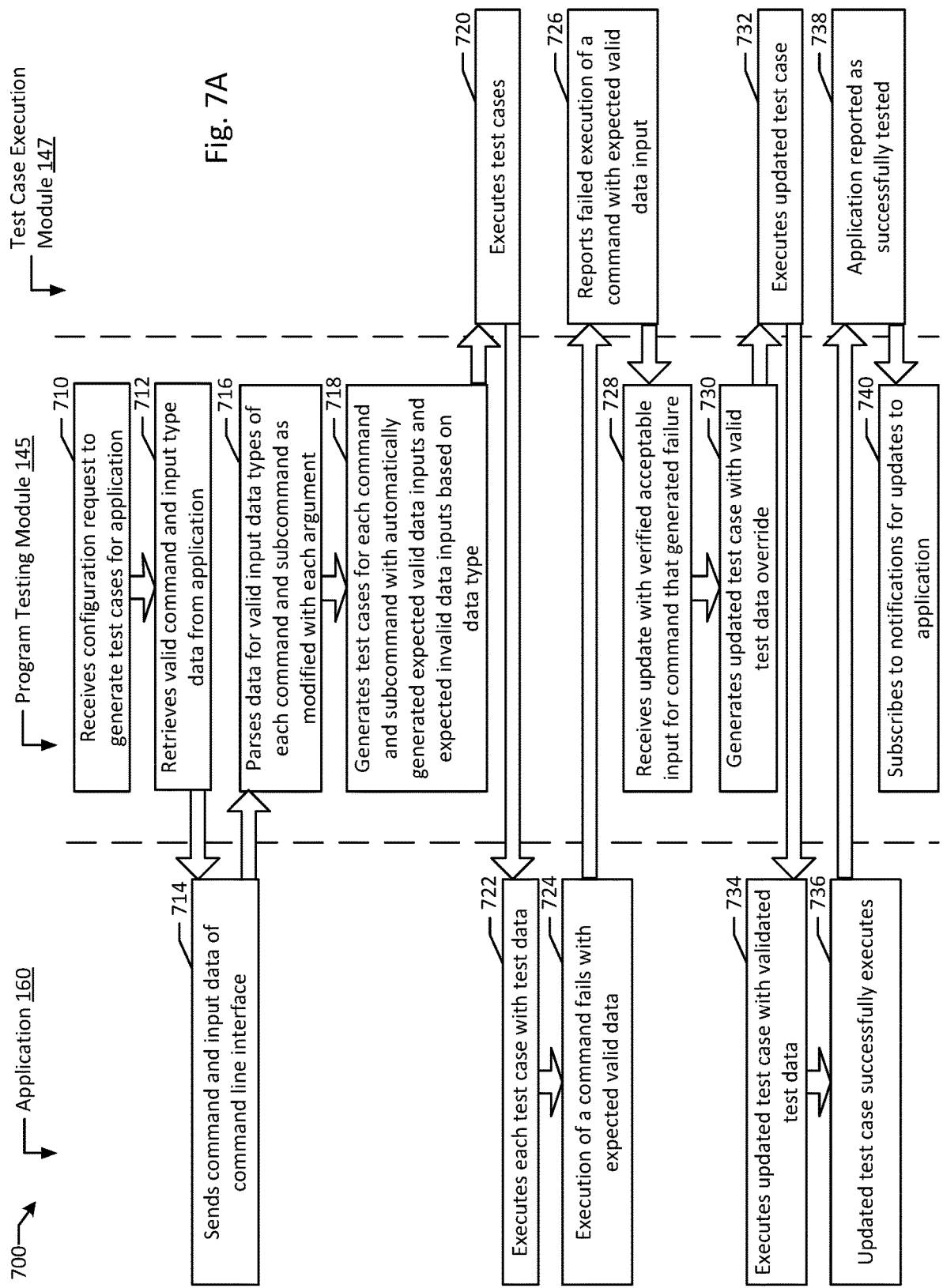
FIGS. 7A-B is flow diagram of an example of automated command line utility testing according to an example of the present disclosure.
Figure 7B:
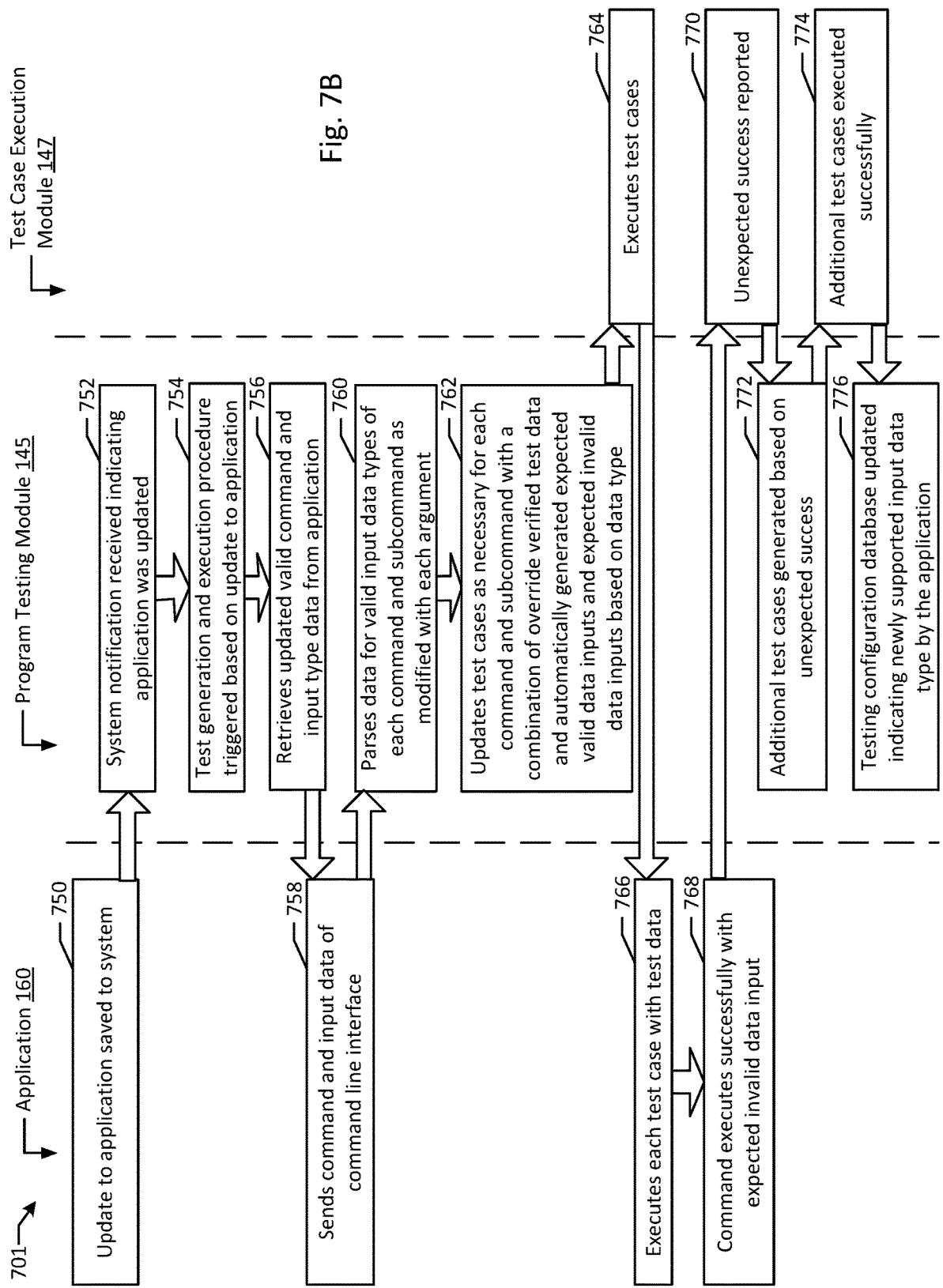

FIGS. 7A-B is flow diagram of an example of automated command line utility testing according to an example of the present disclosure. FIGS. 7A-B is flow diagram of an example of dynamic integration of command line utilities according to an example of the present disclosure. Although the examples below are described with reference to the flowchart illustrated in FIGS. 7A-B, it will be appreciated that many other methods of performing the acts associated with FIGS. 7A-B may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 700-701, program testing module 145 is configured to generate test cases for application 160 which are executed by test case execution module 147, and program testing module 145 automatically generates updated test cases for application 160 for test case execution module 147 to execute in response to application 160 being updated.

In example system 700 depicted in FIG. 7A, a program testing module 145 receives a configuration request to generate test cases for application 160 (block 710). For example, an administrator adds application 160 to a list of applications that program testing module 145 monitors for updates in order to automatically generate test cases for new functionality. In the example, program testing module retrieves valid command and input type data from application 160 (block 712). In the example, application 160 sends command and input data of CLI 162 (e.g., a help file) to program testing module 145 (block 714). Program testing module 145 then parses the data for valid input data types of the commands, subcommands, arguments and combinations accepted by CLI 162 (block 716). In an example, upon initial configuration, program testing module 145 generates both expected success and expected failure test cases for each combination of commands, subcommands, and arguments based on the parsed data for input data types of the respective combinations of commands, subcommands, and arguments (block 718). Test case execution module 147 is then instructed to execute the test cases (e.g., test cases 350, 352, 355, and 357) (block 720). In the example, test case execution module 147 invokes application 160 with each combination of commands, subcommands, and arguments with test data selected based on the input data types attributed to each of the combination of commands, subcommands, and arguments in each test case supplied by program testing module 145. Application 160 executes each test case (e.g., test cases 350, 352, 355, and 357) with the selected test data (e.g., test data 380, 382, 385, 387) block 722. In an example, a test case fails to execute command 170 with expected valid test data 380 (block 724). Test case execution module 147 reports the failed execution of command 170 with test data 380 expected to be a valid data input (block 726). For example, in the hammer repository synchronize from above, program testing module 145 may determine that an expected input is a string of 4 sets of 3 digit integers delimited by periods (e.g., an IP address). In the example, a random IP address may be generated for the repository IP address to be updated, resulting in a failure based on the request to update a non-existent repository.

In an example, after an administrator receives notification that the randomly generated test case with the randomly generated IP address resulted in a failed test, the administrator may override the random IP address with the IP address of a valid Red Hat Satellite® repository. In the example, program testing module 145 receives an update with the verified acceptable input (e.g., the valid IP address) for the hammer repository synchronize example command that generated the failure (block 728). In the example, program testing module 145 generates an updated test case with the valid data overriding randomly generated data (block 730). Test case execution module 147 then executes the updated test case (block 732). In an example, application 160 executes the updated test case with the validated test data (block 734). The updated test case executes successfully (block 736). Test case execution module 147 reports that the application 160 is successfully tested (block 738). After successful initial configuration for testing, program testing module 145 subscribes to notifications from guest OS 196 for updates to application 160 (block 740).

System 701 depicted in FIG. 7B is a future state of system 700, where application 160 receives an update that is saved to the system (block 750). In the example, program testing module 145 receives a notification from guest OS 196 that application 160's files have been updated (block 752). Program testing module 145's configured test generation and execution procedure is triggered based on the update to application 160 (block 754). In the example, program testing module 145 again retrieves application 160's valid command and input type data from application 160 (block 756). Application 160 sends its updated command and input data for CLI 162 (e.g., application 160's updated man page) (block 758). Program testing module 145 parses the updated data for valid input data type, command, subcommand, and argument combinations (block 760). In an example, program testing module 145 caches the previously parsed command and input data, and then on each subsequent update of application 160, parses the differences between the cached previous version of the command and input data against the updated versions. In an example, program testing module 145 updates test cases as necessary for each command, subcommand, and argument combination with a combination of previously validated successful test data (e.g., administrator supplied override test data and previously successful automatically generated data), as well as generating and updating tests cases with test data types that are expected to be invalid based on specified valid input data types (block 762). In the example test case execution module 147 executes the updated test cases (block 764).

In an example, application 160 executes each test case with its respective test data (block 766). However, application 160 successfully executes command 170 with input data expected to be invalid (block 768). In the example, test case execution module 147 reports the unexpected success (e.g., to an administrator (block 770). For example, the updated hammer repository synchronize command successfully executes with a random string as an input. In the example, the update to hammer repository synchronize may have changed the behavior of the command to default to an IP address of the host it is executed on when an invalid input is specified. In an example, program testing module 145 generates additional test cases based on the unexpected success testing other input data types (block 772). In the example, test case execution module 147 executes the additional test cases successfully (block 774). The program testing module 145 then updates a testing configuration database indicating the input data types that are now supported by application 160 (block 776).

Figure 8:
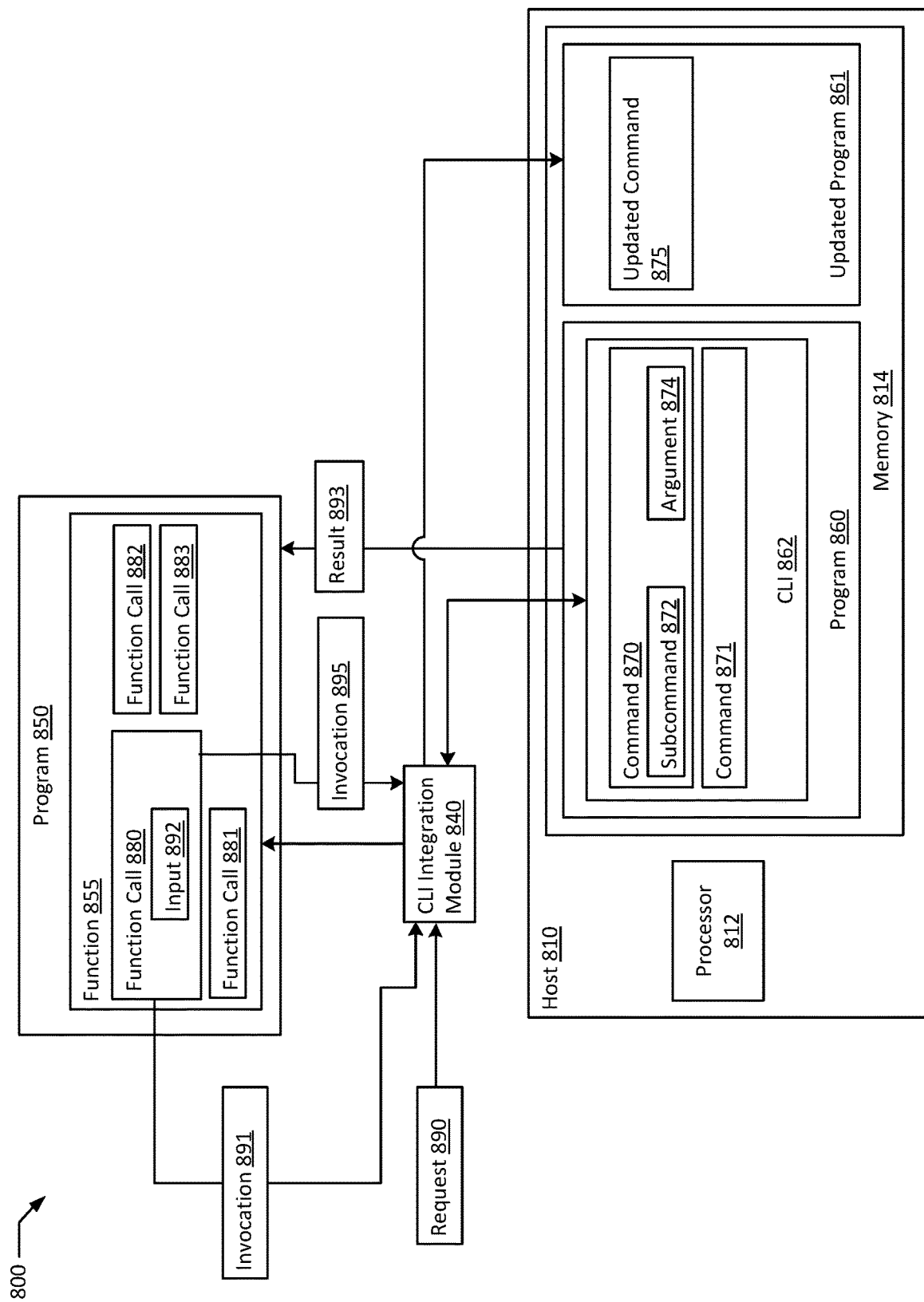
FIG. 8 is a block diagram of an example system implementing dynamic integration of command line utilities according to an example of the present disclosure.

FIG. 8 is a block diagram of an example system implementing dynamic integration of command line utilities according to an example of the present disclosure. Example system 800 includes host 810 with processor 812 and memory 814, where memory 814 stores program 860 with a command line interface (CLI) 862. CLI integration module 840 executes on processor 812 to receive a request 890 to integrate CLI 862 into program 850. CLI integration module 840 discovers commands 870 and 871 accepted by CLI 862, where command 871 accepts subcommand 872 and argument 874. Function 855 is constructed with function call 880 corresponding to command 870, function call 881 corresponding to command 871, function call 882 corresponding to command 870 modified by subcommand 872, and function call 884 corresponding to command 870 modified by argument 874, and function 855 is added to program 850. An invocation 891 of function call 880 is received corresponding to command 870, where function call 880 includes an input 892. In response to invocation 891, command 870 is invoked with input 892. Result 893 is returned from program 860 to program 850. A later invocation 895 of function call 880 is received, and in response, an updated version of command 870 (e.g., updated command 875) is invoked where program 860 is updated (e.g., updated program 861) between a first time of invocation 891 and a second time of invocation 895.

Figure 9:
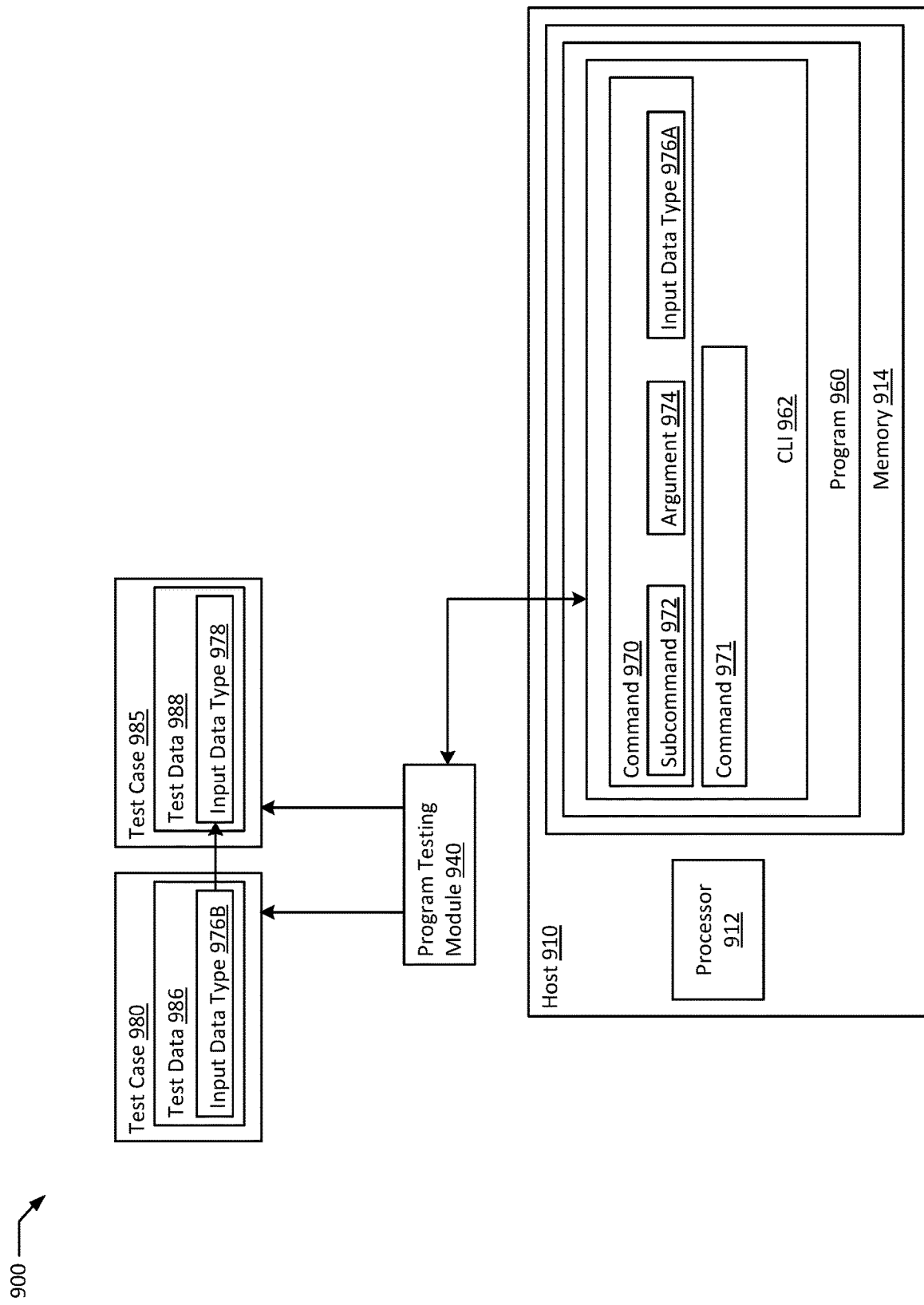
FIG. 9 is a block diagram of an example system implementing automated command line utility testing according to an example of the present disclosure.

FIG. 9 is a block diagram of an example system implementing automated command line utility testing according to an example of the present disclosure. Example system 900 includes host 910 with processor 912 and memory 914, where memory 914 stores program 960 with command line interface (CLI) 962. Program testing module 940 executes on processor 912 to discover commands 970 and 971 accepted by CLI 962, where command 970 additionally accepts subcommand 972 and argument 974. An input data type 976A associated with command 970 is determined. Test case 980 that invokes command 970 with test data 986 of input data type 976B (e.g., the same input data type as input data type 976A) is generated. An input data type 978 incompatible with command 970 is determined based on input data type 976B. Test case 985 that invokes command 970 with test data 988 of input data type 978 is generated. Finally, test cases 980 and 985 are executed.

Dynamic integration of command line utilities enables the functionality of unrelated software packages to be integrated into a new software package without many of the typical maintenance, support, and remediation tasks that result from typical integrations. As such, the CLI integration module of the present disclosure advantageously enhances computer system utilization by reducing downtime due to malfunctioning integrations with third party programs, especially third party programs whose update cycles may be undetectable by a typical debugger or in a typical debugging implementation without elevated rights and potential security risks associated with such elevated rights. In addition, by automating testing tasks relating to external dependencies (e.g., source programs for CLI integrations), implementing the disclosed program testing module further advantageously increases system utilization and application uptime by quickly and systematically discovering potential integration incompatibilities due to updates to source program dependencies of applications. In many cases, the CLI integration module of the present disclosure, especially in conjunction with the program testing module and the test case execution module of the present disclosure are also capable of automatically compensating for updates that affect the input syntax of a source program's CLI. Typically, only changes to a source program resulting in new data inputs unused in any other part of a program with a CLI integration module will require manual intervention, as the CLI integration module may be capable of translating command inputs from a previous syntax to a new syntax, and may also be capable of populating new data fields from an input data repository of the application. Therefore, application uptime is further increased with the elimination of many minor maintenance updates resulting from minor changes to an application's dependencies, which enables a higher overall hardware utilization rate.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system comprises: a host with a processor and a memory, wherein the memory stores a first program with a command line interface (CLI); a CLI integration module executing on the processor to: receive a request to integrate the CLI into a second program; discover a plurality of commands accepted by the CLI, wherein a first command of the plurality of commands additionally accepts a first subcommand and a first argument; construct a function with a respective function call corresponding to each command of the plurality of commands including each subcommand and each argument of each command, wherein the function is added to the second program; receive a first invocation of a first function call corresponding to the first command, wherein the first function call includes a first input; responsive to receiving the first invocation, invoke the first command with the first input; return a result from the first program to the second program; receive a later second invocation of the first function call; and responsive to receiving the second invocation, invoke an updated version of the first command, wherein the first program is updated between a first time of the first invocation and a second time of the second invocation.

In accordance with a 2nd exemplary aspect of the present disclosure, which may be used in combination with any one or more of other aspects described herein (e.g., the 1st aspect), wherein the CLI integration module further executes to: determine a first input data type associated with the first command, wherein the first data type is one of (i) a character, (ii) an integer, (iii) a floating-point number, (iv) a fixed-point number, (v) a boolean, (vi) a pointer, (vii) an array, (viii) a list, (ix) a record, (x) a union, (xi) a set, (xii) an object, (xii) a string, and (xiii) a hash. In accordance with a 3rd exemplary aspect of the present disclosure, which may be used in combination with any one or more of other aspects described herein (e.g., the 2nd aspect), wherein the CLI integration module generates a first test case invoking the first command with first data of the first input data type and a second test case invoking the first command with second data of a different second input data type. In accordance with a 4th exemplary aspect of the present disclosure, which may be used in combination with any one or more of other aspects described herein (e.g., the 2nd aspect), wherein an example input to the first command is parsed to determine the first input data type.

In accordance with a 5th exemplary aspect of the present disclosure, which may be used in combination with any one or more of other aspects described herein (e.g., the 1st aspect), wherein after the first program is updated, the CLI integration module discovers that a new second command with a second subcommand is available in the first program, and the CLI integration module generates a plurality of test cases associated with the second command. In accordance with a 6th exemplary aspect of the present disclosure, which may be used in combination with any one or more of other aspects described herein (e.g., the 1st aspect), wherein the CLI integration module parses at least one of a manual of the first program and a source code of the first program to discover the plurality of commands. In accordance with a 7th exemplary aspect of the present disclosure, which may be used in combination with any one or more of other aspects described herein (e.g., the 1st aspect), wherein the first program and the second program are written in different programming languages. In accordance with an 8th exemplary aspect of the present disclosure, which may be used in combination with any one or more of other aspects described herein (e.g., the 1st aspect), wherein the first program is updated to remove a second command, and the second program is automatically updated by the CLI integration module to remove a second function call corresponding to the second command. In accordance with a 9th exemplary aspect of the present disclosure, which may be used in combination with any one or more of other aspects described herein (e.g., the 1st aspect), wherein a programming language of the second program supports a functionality unsupported by the CLI of the first program. In accordance with a 10th exemplary aspect of the present disclosure, which may be used in combination with any one or more of other aspects described herein (e.g., the 1st aspect), wherein the first program is a virtual guest provisioning utility. In accordance with an 11th exemplary aspect of the present disclosure, which may be used in combination with any one or more of other aspects described herein (e.g., the 1st aspect), wherein the CLI integration module is a module of the second program.

Aspects of the subject matter described herein may be useful alone or in combination with one or more other aspects described herein. In a 12th exemplary aspect of the present disclosure, a method comprises: receiving a request to integrate a command line interface (CLI) of a first program into a second program; discovering a plurality of commands accepted by the CLI, wherein a first command of the plurality of commands additionally accepts a first subcommand and a first argument; constructing a function with a respective function call corresponding to each command of the plurality of commands including each subcommand and each argument of each command, wherein the function is added to the second program; receiving a first invocation of a first function call corresponding to the first command, wherein the first function call includes a first input; responsive to receiving the first invocation, invoking the first command with the first input; returning a result from the first program to the second program; receiving a later second invocation of the first function call; and responsive to receiving the second invocation, invoking an updated version of the first command, wherein the first program is updated between a first time of the first invocation and a second time of the second invocation.

Aspects of the subject matter described herein may be useful alone or in combination with one or more other aspects described herein. In a 13th exemplary aspect of the present disclosure, a system comprises: a means for receiving a request to integrate a command line interface (CLI) of a first program into a second program; a means for discovering a plurality of commands accepted by the CLI, wherein a first command of the plurality of commands additionally accepts a first subcommand and a first argument; a means for constructing a function with a respective function call corresponding to each command of the plurality of commands including each subcommand and each argument of each command, wherein the function is added to the second program; a means for receiving a first invocation of a first function call corresponding to the first command, wherein the first function call includes a first input; a means for responsive to receiving the first invocation, invoking the first command with the first input; a means for returning a result from the first program to the second program; a means for receiving a later second invocation of the first function call;

and a means for responsive to receiving the second invocation, invoking an updated version of the first command, wherein the first program is updated between a first time of the first invocation and a second time of the second invocation.

Aspects of the subject matter described herein may be useful alone or in combination with one or more other aspects described herein. In a 14th exemplary aspect of the present disclosure, a computer-readable non-transitory storage medium storing executable instructions, which when executed by a computer system, cause the computer system to: receive a request to integrate a command line interface (CLI) of a first program into a second program; discover a plurality of commands accepted by the CLI, wherein a first command of the plurality of commands additionally accepts a first subcommand and a first argument; construct a function with a respective function call corresponding to each command of the plurality of commands including each subcommand and each argument of each command, wherein the function is added to the second program; receive a first invocation of a first function call corresponding to the first command, wherein the first function call includes a first input; responsive to receiving the first invocation, invoke the first command with the first input; return a result from the first program to the second program; receive a later second invocation of the first function call; and responsive to receiving the second invocation, invoke an updated version of the first command, wherein the first program is updated between a first time of the first invocation and a second time of the second invocation.

In accordance with a 15th exemplary aspect of the present disclosure, which may be used in combination with any one or more of other aspects described herein (e.g., the 12th, 13th, or 14th aspects), further comprises: determining a first input data type associated with the first command, wherein the first data type is one of (i) a character, (ii) an integer, (iii) a floating-point number, (iv) a fixed-point number, (v) a boolean, (vi) a pointer, (vii) an array, (viii) a list, (ix) a record, (x) a union, (xi) a set, (xii) an object, (xii) a string, and (xiii) a hash. In accordance with a 16th exemplary aspect of the present disclosure, which may be used in combination with any one or more of other aspects described herein (e.g., the 15th aspect), further comprises: generating a first test case invoking the first command with first data of the first input data type and a second test case invoking the first command with second data of a different second input data type. In accordance with a 17th exemplary aspect of the present disclosure, which may be used in combination with any one or more of other aspects described herein (e.g., the 15th aspect), further comprises: parsing an example input to the first command to determine the first input data type.

In accordance with an 18th exemplary aspect of the present disclosure, which may be used in combination with any one or more of other aspects described herein (e.g., the 12th, 13th, or 14th aspects), further comprises: discovering that a new second command with a second subcommand is available in the first program after the first program is updated; and generating a plurality of test cases associated with the second command. In accordance with a 19th exemplary aspect of the present disclosure, which may be used in combination with any one or more of other aspects described herein (e.g., the 12th, 13th, or 14th aspects), further comprises: parsing at least one of a manual of the first program and a source code of the first program to discover the plurality of commands. In accordance with a 20th exemplary aspect of the present disclosure, which may be used in combination with any one or more of other aspects described herein (e.g., the 12th, 13th, or 14th aspects), wherein the first program and the second program are written in different programming languages. In accordance with a 21st exemplary aspect of the present disclosure, which may be used in combination with any one or more of other aspects described herein (e.g., the 12th, 13th, or 14th aspects), further comprises: automatically updating the second program to remove a second function call corresponding to a second command removed from the first program in an update to the first program. In accordance with a 22nd exemplary aspect of the present disclosure, which may be used in combination with any one or more of other aspects described herein (e.g., the 12th, 13th, or 14th aspects), wherein a programming language of the second program supports a functionality unsupported by the CLI of the first program. In accordance with a 23rd exemplary aspect of the present disclosure, which may be used in combination with any one or more of other aspects described herein (e.g., the 12th, 13th, or 14th aspects), wherein the first program is a virtual guest provisioning utility. In accordance with a 24th exemplary aspect of the present disclosure, which may be used in combination with any one or more of other aspects described herein (e.g., the 12th, 13th, or 14th aspects), wherein the CLI integration module is a module of the second program.

Aspects of the subject matter described herein may be useful alone or in combination with one or more other aspects described herein. In a 25th exemplary aspect of the present disclosure, a system comprises: a host with a processor and a memory, wherein the memory stores a first program with a command line interface (CLI); a program testing module executing on the processor to: discover a plurality of commands accepted by the CLI, wherein a first command of the plurality of commands additionally accepts a first subcommand and a first argument; determine a first input data type associated with the first command; generate a first test case that invokes the first command with first test data of the first input data type; determine, based on the first input data type, a second input data type that is incompatible with the first command; generate a second test case that invokes the first command with second test data of the second input data type; and execute the first test case and the second test case.

In accordance with a 26th exemplary aspect of the present disclosure, which may be used in combination with any one or more of other aspects described herein (e.g., the 25th aspect), wherein a third input data type is determined to be compatible with the first command, and a third test case is generated to execute the first command with third test data of the third input data type. In accordance with a 27th exemplary aspect of the present disclosure, which may be used in combination with any one or more of other aspects described herein (e.g., the 25th aspect), wherein an error report is generated based on at least one of (i) the first command failing to execute with the first input data type, and (ii) the first command successfully executing with the second input data type. In accordance with a 28th exemplary aspect of the present disclosure, which may be used in combination with any one or more of other aspects described herein (e.g., the 25th aspect), wherein the first test data is one of randomly generated and selected from a predetermined set of sample data. In accordance with a 26th exemplary aspect of the present disclosure, which may be used in combination with any one or more of other aspects described herein (e.g., the 29th aspect), wherein the first program is updated and a second command is added to the first program, and the program testing module additionally executes to: discover the second command, including a third input data type associated with the second command; generate a third test case that invokes the second command with third test data of the third input data type and a fourth test case that invokes the second command with fourth test data of a different fourth input data type. In accordance with a 30th exemplary aspect of the present disclosure, which may be used in combination with any one or more of other aspects described herein (e.g., the 25th aspect), wherein the first data type is one of (i) a character, (ii) an integer, (iii) a floating-point number, (iv) a fixed-point number, (v) a boolean, (vi) a pointer, (vii) an array, (viii) a list, (ix) a record, (x) a union, (xi) a set, (xii) an object, (xii) a string, and (xiii) a hash. In accordance with a 31st exemplary aspect of the present disclosure, which may be used in combination with any one or more of other aspects described herein (e.g., the 25th aspect), wherein the program testing module is integrated with a CLI integration module, and the CLI integration module executes to: receive a request to integrate the CLI into a second program; construct a function with a respective function call corresponding to each command of the plurality of commands including each subcommand and each argument of each command, wherein the function is added to the second program; receive a first invocation of a first function call corresponding to the first command, wherein the first function call includes a first input; responsive to receiving the first invocation, invoke the first command with the first input; and return a result from the first program to the second program. In accordance with a 32nd exemplary aspect of the present disclosure, which may be used in combination with any one or more of other aspects described herein (e.g., the 25th aspect), wherein the program testing module parses at least one of a manual of the first program and a source code of the first program to discover the plurality of commands. In accordance with a 33rd exemplary aspect of the present disclosure, which may be used in combination with any one or more of other aspects described herein (e.g., the 25th aspect), wherein the first input data type is incompatible with the first subcommand, and a third test case is generated with third test data of a third input data type compatible with the first subcommand.

Aspects of the subject matter described herein may be useful alone or in combination with one or more other aspects described herein. In a 34th exemplary aspect of the present disclosure, a method comprises: discovering a plurality of commands accepted by a command line interface (CLI) of a first program, wherein a first command of the plurality of commands additionally accepts a first subcommand and a first argument; determining a first input data type associated with the first command; generating a first test case that invokes the first command with first test data of the first input data type; determining, based on the first input data type, a second input data type that is incompatible with the first command; generating a second test case that invokes the first command with second test data of the second input data type; and executing the first test case and the second test case.

Aspects of the subject matter described herein may be useful alone or in combination with one or more other aspects described herein. In a 35th exemplary aspect of the present disclosure, a system comprises: a means for discovering a plurality of commands accepted by a command line interface (CLI) of a first program, wherein a first command of the plurality of commands additionally accepts a first subcommand and a first argument; a means for determining a first input data type associated with the first command; a means for generating a first test case that invokes the first command with first test data of the first input data type; a means for determining, based on the first input data type, a second input data type that is incompatible with the first command; a means for generating a second test case that invokes the first command with second test data of the second input data type; and a means for executing the first test case and the second test case.

Aspects of the subject matter described herein may be useful alone or in combination with one or more other aspects described herein. In a 36th exemplary aspect of the present disclosure, a computer-readable non-transitory storage medium storing executable instructions, which when executed by a computer system, cause the computer system to: discover a plurality of commands accepted by a command line interface (CLI) of a first program, wherein a first command of the plurality of commands additionally accepts a first subcommand and a first argument; determine a first input data type associated with the first command; generate a first test case that invokes the first command with first test data of the first input data type; determine, based on the first input data type, a second input data type that is incompatible with the first command; generate a second test case that invokes the first command with second test data of the second input data type; and execute the first test case and the second test case.

In accordance with a 37th exemplary aspect of the present disclosure, which may be used in combination with any one or more of other aspects described herein (e.g., the 34th, 35th, or 36th aspects), further comprises: determining that a third input data type is compatible with the first command; and generating a third test case to execute the first command with third test data of the third input data type. In accordance with a 38th exemplary aspect of the present disclosure, which may be used in combination with any one or more of other aspects described herein (e.g., the 34th, 35th, or 36th aspects), further comprises: generating an error report based on at least one of (i) the first command failing to execute with the first input data type, and (ii) the first command successfully executing with the second input data type. In accordance with an 39th exemplary aspect of the present disclosure, which may be used in combination with any one or more of other aspects described herein (e.g., the 34th, 35th, or 36th aspects), wherein the first test data is one of randomly generated and selected from a predetermined set of sample data. In accordance with a 40th exemplary aspect of the present disclosure, which may be used in combination with any one or more of other aspects described herein (e.g., the 34th, 35th, or 36th aspects), wherein the first program is updated and a second command is added to the first program, the method further comprises: discovering the second command, including a third input data type associated with the second command; and generating a third test case that invokes the second command with third test data of the third input data type and a fourth test case that invokes the second command with fourth test data of a different fourth input data type. In accordance with a 41st exemplary aspect of the present disclosure, which may be used in combination with any one or more of other aspects described herein (e.g., the 34th, 35th, or 36th aspects), wherein the first data type is one of (i) a character, (ii) an integer, (iii) a floating-point number, (iv) a fixed-point number, (v) a boolean, (vi) a pointer, (vii) an array, (viii) a list, (ix) a record, (x) a union, (xi) a set, (xii) an object, (xii) a string, and (xiii) a hash. In accordance with a 42nd exemplary aspect of the present disclosure, which may be used in combination with any one or more of other aspects described herein (e.g., the 34th, 35th, or 36th aspects), further comprises: receiving a request to integrate the CLI into a second program; constructing a function with a respective function call corresponding to each command of the plurality of commands including each subcommand and each argument of each command, wherein the function is added to the second program; receiving a first invocation of a first function call corresponding to the first command, wherein the first function call includes a first input; responsive to receiving the first invocation, invoking the first command with the first input; and returning a result from the first program to the second program. In accordance with a 43rd exemplary aspect of the present disclosure, which may be used in combination with any one or more of other aspects described herein (e.g., the 34th, 35th, or 36th aspects), further comprises: parsing at least one of a manual of the first program and a source code of the first program to discover the plurality of commands. In accordance with a 44th exemplary aspect of the present disclosure, which may be used in combination with any one or more of other aspects described herein (e.g., the 34th, 35th, or 36th aspects), wherein the first input data type is incompatible with the first subcommand, and a third test case is generated with third test data of a third input data type compatible with the first subcommand.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a host with a processor and a memory, wherein the memory stores a first program with a command line interface (CLI); and
a program testing module executing on the processor to:
discover a plurality of commands accepted by the CLI, wherein a first command of the plurality of commands additionally accepts a first subcommand and a first argument;
determine a first input data type associated with the first command;
generate a first test case that invokes the first command with first test data of the first input data type;
determine, based on the first input data type, a second input data type that is incompatible with the first command;
generate a second test case that invokes the first command with second test data of the second input data type;
execute the first test case and the second test case, wherein discovering the plurality of commands accepted by the CLI is performed without access to a source code of the first program by parsing a manual of the first program to discover each one of the plurality of commands accepted by the CLI, and respective subcommands and arguments for each discovered command, such that each valid combination of commands, subcommands, and arguments accepted by the CLI are discovered by parsing the manual of the first program;
subscribe to notifications from an operating system (OS) about updates to the first program; and
in response to receipt of a notification from the OS indicating that the first program is updated, rediscover the plurality of commands accepted by the CLI of the first program.

2. The system of claim 1, wherein a third input data type is determined to be compatible with the first command, and a third test case is generated to execute the first command with third test data of the third input data type.

3. The system of claim 1, wherein an error report is generated based on at least one of (i) the first command failing to execute with the first input data type, and (ii) the first command successfully executing with the second input data type.

4. The system of claim 1, wherein the first test data is one of randomly generated and selected from a predetermined set of sample data.

5. The system of claim 1, wherein rediscovering the plurality of commands includes the program testing module executing to:
discover a second command added to the updated first program, and a third input data type associated with the second command; and
generate a third test case that invokes the second command with third test data of the third input data type and a fourth test case that invokes the second command with fourth test data of a different fourth input data type.

6. The system of claim 1, wherein the first data type is one of (i) a character, (ii) an integer, (iii) a floating-point number, (iv) a fixed-point number, (v) a Boolean, (vi) a pointer, (vii) an array, (viii) a list, (ix) a record, (x) a union, (xi) a set, (xii) an object, (xii) a string, and (xiii) a hash.

7. The system of claim 1, wherein the program testing module is integrated with a CLI integration module, and the CLI integration module executes to:
receive a request to integrate the CLI into a second program;
construct a function with a respective function call corresponding to each command of the plurality of commands including each subcommand and each argument of each command, wherein the function is added to the second program;
receive a first invocation of a first function call corresponding to the first command, wherein the first function call includes a first input;
responsive to receiving the first invocation, invoke the first command with the first input; and return a result from the first program to the second program.

8. The system of claim 1, wherein the first input data type is incompatible with the first subcommand, and a third test case is generated with third test data of a third input data type compatible with the first subcommand.

9. A method comprising:
discovering a plurality of commands accepted by a command line interface (CLI) of a first program, wherein a first command of the plurality of commands additionally accepts a first subcommand and a first argument;
determining a first input data type associated with the first command;
generating a first test case that invokes the first command with first test data of the first input data type;
determining, based on the first input data type, a second input data type that is incompatible with the first command;
generating a second test case that invokes the first command with second test data of the second input data type;
executing the first test case and the second test case, wherein discovering the plurality of commands accepted by the CLI is performed without access to a source code of the first program by parsing a manual of the first program to discover each one of the plurality of commands accepted by the CLI, and respective subcommands and arguments for each discovered command, such that each valid combination of commands, subcommands, and arguments accepted by the CLI are discovered by parsing the manual of the first program;
subscribing to notifications from an operating system (OS) about updates to the first program; and
in response to receipt of a notification from the OS indicating that the first program is updated, rediscovering the plurality of commands accepted by the CLI of the first program.

10. A system comprising:
a host with a processor and a memory, wherein the memory stores a first program with a command line interface (CLI); and
a CLI integration module executing on the processor to:
receive a request to integrate the CLI into a second program;
discover a plurality of commands accepted by the CLI, wherein a first command of the plurality of commands additionally accepts a first subcommand and a first argument;
construct a function with a respective function call corresponding to each command of the plurality of commands including each subcommand and each argument of each command, wherein the function is added to the second program;
receive a first invocation of a first function call corresponding to the first command, wherein the first function call includes a first input;
responsive to receiving the first invocation, invoke the first command with the first input;
return a result from the first program to the second program;
receive a later second invocation of the first function call;
responsive to receiving the second invocation, invoke an updated version of the first command, wherein the first program is updated between a first time of the first invocation and a second time of the second invocation, and wherein discovering the plurality of commands accepted by the CLI is performed without access to a source code of the first program by parsing a manual of the first program to discover each one of the plurality of commands accepted by the CLI, and respective subcommands and arguments for each discovered command, such that each valid combination of commands, subcommands, and arguments accepted by the CLI are discovered by parsing the manual of the first program;
subscribe to notifications from an operating system (OS) about updates to the first program; and
in response to receipt of a notification from the OS indicating that the first program is updated, rediscover the plurality of commands accepted by the CLI of the first program, wherein rediscovering the plurality of commands includes discovering the updated version of the first command.

11. The system of claim 10, wherein the CLI integration module further executes to:
determine a first input data type associated with the first command, wherein the first data type is one of (i) a character, (ii) an integer, (iii) a floating-point number, (iv) a fixed-point number, (v) a Boolean, (vi) a pointer, (vii) an array, (viii) a list, (ix) a record, (x) a union, (xi) a set, (xii) an object, (xii) a string, and (xiii) a hash.

12. The system of claim 11, wherein the CLI integration module generates a first test case invoking the first command with first data of the first input data type and a second test case invoking the first command with second data of a different second input data type.

13. The system of claim 11, wherein an example input to the first command is parsed to determine the first input data type.

14. The system of claim 10, wherein rediscovering the plurality of commands after the first program is updated includes the CLI integration module discovering that a new second command with a second subcommand is available in the updated first program, and
wherein the CLI integration module generates a plurality of test cases associated with the second command.

15. The system of claim 10, wherein the first program and the second program are written in different programming languages, and a programming language of the second program supports a functionality unsupported by the CLI of the first program.

16. The system of claim 10, wherein rediscovering the plurality of commands includes the CLI integration module discovering that the first program is updated to remove a second command, and
wherein the CLI integration module automatically updates the second program to remove a second function call corresponding to the second command in response to discovering that the first program is updated to remove the second command.

17. The system of claim 10, wherein the first program is a virtual guest provisioning utility.

18. The system of claim 10, wherein the CLI integration module is a module of the second program.

* * * * *